US011336610B2

United States Patent
Khan

(10) Patent No.: US 11,336,610 B2
(45) Date of Patent: May 17, 2022

(54) EMAIL SENDER AND REPLY-TO AUTHENTICATION TO PREVENT INTERCEPTION OF EMAIL REPLIES

(71) Applicant: Zafar Khan, Los Angeles, CA (US)

(72) Inventor: Zafar Khan, Los Angeles, CA (US)

( * ) Notice: Subject to any disclaimer, the term of this patent is extended or adjusted under 35 U.S.C. 154(b) by 0 days.

(21) Appl. No.: 17/025,955

(22) Filed: Sep. 18, 2020

(65) Prior Publication Data

US 2021/0058358 A1  Feb. 25, 2021

Related U.S. Application Data

(62) Division of application No. 15/469,388, filed on Mar. 24, 2017, now abandoned.

(60) Provisional application No. 62/317,263, filed on Apr. 1, 2016, provisional application No. 62/313,672, filed on Mar. 25, 2016.

(51) Int. Cl.
*H04L 51/23* (2022.01)
*G06Q 10/10* (2012.01)
*H04L 51/00* (2022.01)
*H04L 29/06* (2006.01)

(52) U.S. Cl.
CPC .......... *H04L 51/30* (2013.01); *G06Q 10/107* (2013.01); *H04L 51/12* (2013.01); *H04L 63/0442* (2013.01); *H04L 63/08* (2013.01); *H04L 63/1483* (2013.01)

(58) Field of Classification Search
CPC ..... H04L 51/30; H04L 51/12; H04L 63/1483; G06Q 10/107
See application file for complete search history.

(56) References Cited

U.S. PATENT DOCUMENTS

| | | | | |
|---|---|---|---|---|
| 7,921,063 B1* | 4/2011 | Quinlan | ................. | G06N 7/005 706/12 |
| 9,154,514 B1* | 10/2015 | Prakash | ................... | H04L 51/12 |
| 9,245,115 B1* | 1/2016 | Jakobsson | ........... | H04L 63/1483 |
| 2003/0028767 A1* | 2/2003 | Bickford | ................. | H04L 63/04 713/169 |
| 2004/0249895 A1* | 12/2004 | Way | .................... | H04L 63/0236 709/206 |
| 2005/0188024 A1* | 8/2005 | Singer | ..................... | H04L 51/12 709/206 |

(Continued)

OTHER PUBLICATIONS

Resnick, "RFC 5322 Internet Message Format", Oct. 2008, Internet Engineering Task Force, whole document.*

*Primary Examiner* — Douglas B Blair
(74) *Attorney, Agent, or Firm* — Fitzgerald IP Law; John K Fitzgerald, Esq.

(57) ABSTRACT

An electronic messaging system that reviews content of inbound messages, verifies elements of header fields, and initiates an action if Name (N) and Address (A) of From (F) and Reply-To (R) elements of header fields match or do not match, those elements being $N_F=N_R$ and $A_F \neq A_R$, to protect recipients against inadvertent routing of their reply email to an imposter of the named From sender, thereby mitigating risk of recipients falling prey to what is referred to herein as "Reply-To Whaling" attacks, within the email security category of anti-phishing.

13 Claims, 15 Drawing Sheets

(56) References Cited

U.S. PATENT DOCUMENTS

| | | | | |
|---|---|---|---|---|
| 2006/0095524 | A1* | 5/2006 | Kay | G06Q 10/107 |
| | | | | 709/206 |
| 2007/0107053 | A1* | 5/2007 | Shraim | H04L 51/12 |
| | | | | 726/22 |
| 2007/0192853 | A1* | 8/2007 | Shraim | H04L 63/1483 |
| | | | | 726/22 |
| 2007/0294352 | A1* | 12/2007 | Shraim | H04L 63/1491 |
| | | | | 709/206 |
| 2007/0299777 | A1* | 12/2007 | Shraim | H04L 63/1441 |
| | | | | 705/51 |
| 2007/0299915 | A1* | 12/2007 | Shraim | H04L 63/1491 |
| | | | | 709/206 |
| 2009/0049142 | A1* | 2/2009 | Jones | G06Q 10/107 |
| | | | | 709/206 |
| 2012/0331551 | A1* | 12/2012 | van Steenbergen | H04L 45/02 |
| | | | | 726/22 |
| 2015/0149926 | A1* | 5/2015 | Leonard | G06F 3/0484 |
| | | | | 715/752 |
| 2016/0337401 | A1* | 11/2016 | Bendersky | H04L 63/1483 |
| 2020/0067861 | A1* | 2/2020 | Leddy | H04L 51/12 |

* cited by examiner

"Friendly Name" <emailaddress>

View in a received email

T: "Zafar Khan" zkh__@rp__.com

Subject: RE: Request for November 19, 2015

We need to know the details of whom we are paying. Account name What is this for? Need invoice or supporting docs as well.
LZ

EMAIL SENDER AND REPLY-TO AUTHENTICATION TO PREVENT INTERCEPTION OF EMAIL REPLIES

CROSS-REFERENCE TO RELATED APPLICATIONS

This application is a divisional application of U.S. application Ser. No. 15/469,388, filed Mar. 24, 2017, entitled "EMAIL SENDER AND REPLY-TO AUTHENTICATION TO PREVENT INTERCEPTION OF EMAIL REPLIES", and claims the benefit of priority to the earlier filed U.S. Provisional Application No. 62/313,672, filed on Mar. 25, 2016, entitled "EMAIL SENDER AND REPLY-TO AUTHENTICATION", and U.S. Provisional Application No. 62/317,263, filed on Apr. 1, 2016, entitled "EMAIL SENDER AND REPLY-TO AUTHENTICATION TO PREVENT INTERCEPTION OF EMAIL REPLIES", which are incorporated reference herein in their entireties.

FIELD OF THE INVENTION

This invention relates to electronic messaging security within the category of anti-phishing, and the sub-category of anti-whaling, in terms of protecting the recipient of an electronic message from inadvertent routing of a reply message to an imposter of the named sender, using the invention's automated sender authentication and alert system.

BACKGROUND OF THE INVENTION

Mail assumed electronic format in 1965 and was given the name "Email". Email started as a way for multiple users of a time-sharing mainframe computer to communicate with each other. Email was quickly extended to become 'network email', allowing users to pass messages between different computers by at least 1966. Email today has become a communications tool that is simple enough for individuals to use regardless of their level of technical knowledge or understanding of how email works.

Today, email (defined herein to include of today's variety of electronic messaging protocols such as SMS and MIMS) is often relied up for important communications among people and used to instruct people to do things. When people today receive an email from a sender, they often do not question the authenticity of the sender or content received.

A normal email user knows how to receive, view, read, reply-to, forward, and send email. More advanced email users may configure their email program to automatically filter email to be placed in certain folders, or mark email with various levels of importance.

Some of these email users may install third party programs to assist them in dealing with the various known and common security threats associated with email. Users (senders of email and/or recipients) or email system administrators may add software at the email server, email gateways, or email user interface (commonly referred to as "Email Client"). These add-on software programs may scan email to detect, block, and/or highlight malicious software programs hidden within the email messages (commonly referred to as "virus"), unsolicited marketing email (commonly referred to as "spam"), masked hypertext links in messages received that re-direct to imposter websites (commonly referred to as "phishing"), among others.

Phishing is an example of social engineering techniques used to deceive users. The term "phishing" is defined as an attempt to acquire sensitive information, such as, for example, usernames, passwords, and credit card details (and sometimes, indirectly, money and the like), often for malicious reasons, by masquerading as a trustworthy entity in an electronic communication. The word is a neologism created as a homophone of fishing due to the similarity of using a bait in an attempt to catch a victim. Communications purporting to be from popular social web sites, auction sites, banks, online payment processors or IT administrators are commonly used to lure unsuspecting victims, and may also contain links to websites that are infected with malware.

Phishing is typically carried out by email spoofing (the creation of email messages with a forged sender address sent from an imposter email system), and it often directs users to enter details at a fake website whose look and feel are almost identical to the legitimate one.

Attempts to deal with the growing number of reported phishing incidents include legislation, user training, public awareness, and technical security measures.

Active technology working groups that focus on anti-phishing security software and techniques include the Anti-Phishing Working Group (APWG). APWG is an international consortium that brings together businesses affected by phishing attacks, security products and services companies, law enforcement agencies, government agencies, trade association, regional international treaty organizations and communications companies. The APWG has more than 3200 members from more than 1700 companies and agencies worldwide.

US Legislation had been introduced to identify those using these techniques as Internet criminals. The Anti-Phishing Act of 2005, sponsored by Sen. Patrick J. Leahy (Vt.), would allow prosecutors to impose fines of up to $250,000 and jail terms of up to five years against anyone convicted of creating fake corporate Web sites and fraudulent email messages designed to fleece consumers. The legislation would prevent online parodies and political speech from being prosecuted as phishing.

Phishing is a continual threat, and the risk is even larger in social media such as Facebook, Twitter, and Google+. Internet criminals often create a clone of a website and lure a victim into entering personal information, which is then emailed to the Internet criminals. Internet criminals commonly take advantage of these sites to lure people to provide information in order to take personal and security information that can affect the user or company (if in a workplace environment).

Phishing takes advantage of the trust that the user may have in recognizable names or branded (fake) websites as the user may not have the sophistication to be able to tell that the site being visited, or the program being used, is not real; therefore, when this occurs, the Internet criminal has the chance to gain the personal information of the targeted user, such as passwords, usernames, security codes, and credit card numbers, among other things. The Internet criminal then uses the gathered information to access personal or corporate information, such as bank accounts, email accounts, and make credit card charges against those accounts, stealing money from the unknowing email user.

Within the general category of phishing, an emerging sub category is called "whaling". Whaling is a specific kind of malicious hacking that involves using external sources to hunt for data that can be used by the Internet criminal to collect information about targets who are high-ranking bankers, executives or others in powerful positions or job titles. Often the Internet criminal will use advanced human resource recruiting tools such as advanced Linked-in access to gather information about the target users (recipients of the fake email) and the sender of whom they wish to imposter.

Today, one of the prevalent targets of whaling attacks are consumers in the home buying process, where these consumers are sent instructions to send payment to Internet criminals masquerading as the authentic escrow agent for the home purchase. The consumer is tricked into sending the down payment to the imposter bank account.

Internet criminals who engage in whaling often describe these efforts as "reeling in a big fish," applying a familiar metaphor to the process of scouring technologies for loopholes and opportunities for data theft. In gambling, for example, the term "whales" is used to describe high-stakes rollers who are given special VIP treatment.

Those who are engaged in whaling may, for example, hack into specific networks where these powerful individuals work or store sensitive data. They may also set up keylogging or other malware on a work station associated with one of these executives. There are many ways that Internet criminals can pursue whaling.

As with any phishing endeavor, the goal of whaling is to trick someone into disclosing personal or corporate information through social engineering, or more commonly today with whaling, convince the email recipient to send money using electronic funds transfer for a payment that they believe is legitimate. Techniques often use email spoofing and content spoofing efforts. For example, the Internet criminal may send his or her target an email that appears as if it's from a trusted source or lure the target to a website that has been created especially for the attack, or to trick the target to transfer money to the Internet criminal. Whaling emails and websites are highly customized and personalized, often incorporating the target's name, job title or other relevant information gleaned from a variety of sources.

Due to their focused nature, whaling attacks are often harder to detect than standard phishing attacks. Security administrators generally attempt to prevent successful "whaling expeditions" by encouraging corporate management staff to undergo information security awareness training. However, such training is often ineffective in reducing the occurrence of personal data due to a carefully constructed whaling attack.

The US Federal Bureau of Investigation (FBI) has issued Public Service Announcements (PSA) for Business E-mail Compromise (BEC), which is their formal name for "whaling". (BEC) PSA I-012215-PSA posted on www.IC3.gov and includes new information and updated statistical data as of August 2015.

The FBI defines this version of Business Email Compromise as a sophisticated scam targeting businesses working with foreign suppliers and/or businesses that regularly perform wire transfer payments. The scam is carried out by compromising legitimate business e-mail accounts through social engineering or computer intrusion techniques to conduct unauthorized transfers of funds.

Most victims report using wire transfers as a common method of transferring funds for business purposes; however, some victims report using checks as a common method of payment. The Internet criminals will use the method most commonly associated with their victim's normal business practices.

The FBI reports that BEC scams continue to grow and evolve and target businesses of all sizes. As of August 2015, the FBI reports that there has been a 270 percent increase in identified victims and exposed loss since January 2015. The scam has been reported in all 50 states and in 79 countries. Fraudulent transfers have been reported going to 72 countries; however, the majority of the transfers go to Asian banks located within China and Hong Kong. The following BEC statistics were reported to the FBI's Internet Crime Complaint Center from October 2013 to August 2015:

TABLE 1

| | |
|---|---|
| Total U.S. Victims | 7,066 |
| Total U.S. exposed dollar loss | $747,659,840.63 |
| Total non-U.S. victims | 1,113 |
| Total non-U.S. exposed dollar loss | $ 51,238,118.62 |
| Combined victims | 8,179 |
| Combined exposed dollar loss | $798,897,959.25 |

The FBI reports that these totals, combined with those identified by international law enforcement agencies during this same time period, bring the BEC exposed loss to over $1.2 billion.

The FBI further reports that there has been an increase in the number of reported computer intrusions linked to BEC scams. These intrusions can initially be facilitated through a phishing scam in which a victim receives an email from a seemingly legitimate source that contains a malicious link. In these schemes, the victim clicks on the link, causing it to download malware to the victim's computer, allowing the actor(s) unfettered access to the victim's data, including passwords or financial account information.

A number of versions of the BEC scam have been described in PSA I-012215-PSA.

In Version 1, a business, which often has a long standing relationship with a supplier, is asked to wire funds for invoice payment to an alternate, fraudulent account. The request may be made via telephone, facsimile or e-mail. If an e-mail is received, the e-mail request will be spoofed so it appears very similar to a legitimate account and would take very close scrutiny to determine it was fraudulent. Likewise, if a facsimile or telephone call is received, it will closely mimic a legitimate request. This particular version has also been referred to as "The Bogus Invoice Scheme," "The Supplier Swindle," and "Invoice Modification Scheme."

In Version 2, the e-mail accounts of high-level business executives (CFO, CTO, and the like) are compromised. The account may be spoofed or hacked. A request for a wire transfer from the compromised account is made to a second employee within the company who is normally responsible for processing these requests. In some instances a request for a wire transfer from the compromised account is sent directly to the financial institution with instructions to urgently send funds to bank "X" for reason "Y." This particular version has also been referred to as "CEO Fraud," "Business Executive Scam," "Masquerading," and "Financial Industry Wire Frauds."

In Version 3, an employee of a business has his/her personal e-mail hacked. Requests for invoice payments to fraudster-controlled bank accounts are sent from this employee's personal e-mail to multiple vendors identified from this employee's contact list. The business may not become aware of the fraudulent requests until they are contacted by their vendors to follow up on the status of their invoice payment.

A fourth version of this scam has recently been identified by the FBI, based on victim complaints. Victims report being contacted by fraudsters, who typically identify themselves as lawyers or representatives of law firms and claim to be handling confidential or time-sensitive matters. This contact may be made via either phone or e-mail. Victims are typically pressured by the fraudster to act quickly or secretly in handling the transfer of funds. This type of BEC scam may occur at the end of the business day or work week or be timed to coincide with the close of business of international financial institutions.

The FBI reports that businesses have implemented various measures to protect from BEC scams, such as, for example, businesses have:

1. raised awareness of the BEC scam has helped businesses detect the scam before sending payments to the fraudsters. Some financial institutions reported holding their customer requests for international wire transfers for an additional period of time, to verify the legitimacy of the request;

2. created intrusion detection system rules that flag e-mails with extensions that are similar to company e-mail. For example, legitimate e-mail of abc_company.com would flag fraudulent e-mail of abc-company.com;

3. registered all company domains that are slightly different than the actual company domain;

4. verified changes in vendor payment location by adding additional two-factor authentication such as having a secondary sign-off by company personnel;

5. confirmed requests for transfers of funds. When using phone verification as part of a two-factor authentication, employees are trained to use previously known numbers, not the numbers provided in the e-mail request;

6. learned the habits of its customers, including the details of, reasons behind, and amount of payments;

7. trained their employees to carefully scrutinize all e-mail requests for transfer of funds to determine if the requests are out of the ordinary;

8. trained their employees to verify changes in vendor payment location and confirm requests for transfer of funds;

9. Regarding wire transfer payments, trained their employees to be suspicious of requests for secrecy or pressure to take action quickly;

10. considered financial security procedures that include a two-step verification process for wire transfer payments;

11. created intrusion detection system rules that flag e-mails with extensions that are similar to company e-mail but not exactly the same; for example, .co instead of .com.

Most of the solutions noted by the FBI that business are employing are related to heightened awareness of the phishing and whaling. Some describe technical solutions to prevent download of keylogging software or other hacking attempts. Others focus on identifying the validity of website links.

Another technical solution commonly employed is to place software at the email server receiving inbound email and to scan those messages for hypertext links (HTTP and HTTPS) and verify if those links are associated with known fake websites, or if the underlying link display name includes a website URL address that is differing from the URL route-to address in the underlying hypertext link schema.

However, there are no solutions described that mitigate the particular type of whaling attack from which the various embodiments of the present invention protects. This type of attack exploits standard Internet electronic messaging protocols associated with the Reply-To message header field, which will be referred hereafter as "Reply-To Whaling".

Reply-to Whaling will not be discussed in the context of Internet Text Messaging and Protocols described in RFC0822 and RFC5322, among other RFCs, and commonly referred to as "email". However, one will immediately understand that problem and technical solution provided by the present invention also applies to other electronic messaging protocols and systems with a reply function.

Internet protocols for email, as defined in RFC0822, Standard for ARPA Internet Text Messages, provide for a reply-to address to be included as a header in any email sent. Section (4) MESSAGE SPECIFICATION, (4.3.1) RETURN-PATH, describes the protocol for reply-to message headers.

This field is added by the final transport system that delivers the message to its recipient. The field is intended to contain definitive information about the address and route back to the message's originator. The "Reply-To" field is added by the originator and serves to direct replies, whereas the "Return-Path" field is used to identify a path back to the originator.

Internet protocols for email, as defined in RFC5322, Standard for Internet Message Format Section 3.6.2., Originator Fields, also applies. The relevant sections of RFC5322 Section 3.6.2 describe that the originator fields of a message consist of the 1) From field, 2) the sender field (when applicable), and 3) optionally the reply-to field. The From field consists of the field name "From" and a comma separated list of one or more mailbox specifications. If the From field contains more than one mailbox specification in the mailbox list, then the Sender field, containing the field name "Sender" and a single mailbox specification, MUST appear in the message. In either case, an optional Reply-to field MAY also be included, which contains the field name "Reply-To" and a comma-separated list of one or more addresses:

from="From:" mailbox-list CRLF
sender="Sender:" mailbox CRLF
reply-to="Reply-To:" address-list CRLF The originator fields indicate the mailbox(es) of the source of the message. The "From:" field specifies the author(s) of the message, that is, the mailbox(es) of the person(s) or system(s) responsible for the writing of the message. The "Sender:" field specifies the mailbox of the agent responsible for the actual transmission of the message. For example, if a secretary sends a message for another person, the mailbox of the secretary appears in the "Sender:" field and the mailbox of the actual author would appear in the "From:" field. If the originator of the message can be indicated by a single mailbox and the author and transmitter are identical, the "Sender:" field SHOULD NOT be used. Otherwise, both fields SHOULD appear. The transmitter information is always present.

The absence of the "Sender:" field is sometimes mistakenly taken to mean that the agent responsible for transmission of the message has not been specified. This absence merely means that the transmitter is identical to the author and is therefore not redundantly placed into the "Sender:" field.

The originator fields also provide the information required when replying to a message. When the "Reply-To:" field is present, it indicates the address(es) to which the author of the message suggests that replies be sent. In the absence of the "Reply-To:" field, replies SHOULD by default be sent to the mailbox(es) specified in the "From:" field unless otherwise specified by the person composing the reply. In all cases, the "From:" field SHOULD NOT contain any mailbox that does not belong to the author(s) of the message.

Due to the Internet protocols for email, as defined in RFC5322 Standard for Internet Message Format and RFC0822 Standard for ARPA Internet Text Messages, and in particular Section (4.4.3) REPLY-TO/RESENT-REPLY-TO, the reply-to header is used by Internet criminals in certain types of whaling attacks.

This REPLY-TO field provides a general mechanism for indicating any mailbox(es) to which responses are to be sent. The RFC0822 Section 4.4.3 describes three typical uses for this feature.

In the first case, the author(s) may not have regular machine-based mail-boxes and therefore wish(es) to indicate an alternate machine address. In the second case, an author may wish additional persons to be made aware of, or responsible for, replies. A somewhat different use may be of some help to "text message teleconferencing" groups equipped with automatic distribution services: include the address of that service in the "Reply-To" field of all messages submitted to the teleconference; then participants can "reply" to conference submissions to guarantee the correct distribution of any submission of their own.

The "Return-Path" field is added by the mail transport service, at the time of final deliver. It is intended to identify a path back to the originator of the message. The "Reply-To" field is added by the message originator and is intended to direct replies.

In most email sent today, either this REPLY-TO field is empty, or it contains the original sender email address. The RFC0822, Section (4.4.4) AUTOMATIC USE OF FROM/SENDER/REPLY-TO, describes the hierarchy of how email should operate considering the REPLY-TO header field. For systems which automatically generate address lists for replies to messages, the following recommendations are made: (a) The "Sender" field mailbox should be sent notices of any problems in transport or delivery of the original messages; if there is no "Sender" field, then the "From" field mailbox should be used; (b) tThe "Sender" field mailbox should NEVER be used automatically, in a recipient's reply message; (c) if the "Reply-To" field exists, then the reply should go to the addresses indicated in that field and not to the address(es) indicated in the "From" field; (d) if there is a "From" field, but no "Reply-To" field, the reply should be sent to the address(es) indicated in the "From" field.

Sometimes, a recipient may actually wish to communicate with the person that initiated the message transfer. In such cases, it is reasonable to use the "Sender" address. This recommendation is intended only for automated use of originator-fields and is not intended to suggest that replies may not also be sent to other recipients of messages. It is up to the respective mail-handling programs to decide what additional facilities will be provided.

One tactic that Internet criminals engaged in whaling often employ is a tactic to exploit the order of operations described in the Internet protocol form email, RFC0822, Section (4.4.4) AUTOMATIC USE OF FROM/SENDER/REPLY-TO. In particular, this protocol describes the hierarchy of how email should operate considering the situation where the "Reply-To" field is valid (an email address exists in that field). The RFC0822 4.4.4 states that compliant mail servers and mail client programs as a priority in their order of operations must send the message reply to the Reply-To address over the address in the From field and never except for automated recipient server generated responses, the address in the Sender field.

The following describes one example of the "Reply-To Whaling" scheme from which the various embodiments of the present invention protect.

Internet criminals exploit the "From" and "Reply-To" email message header fields by using Internet-based research or with non-public information sources and account hacking to identify a target recipient name, job title, and email address, and a sender name, job title, and email address. The Internet criminal often targets a sender known to the recipient as having the authority to direct the recipient to transfer money.

With this information, the Internet criminal exploits the standard internet message format and internet message transmission protocols of RFC5322 and RFC0822 to send the email from Internet criminal's own computer or automated criminal email sending system, with the From header field "friendly name" and From header field "email address" being the "known person of authority", and the Recipient header field "friendly name" and Recipient header field "email address" being the "known administrator who has access to transfer money upon receipt of instructions from the person of authority", and the Reply-To header field "friendly name" being the name of the known person of authority, and uniquely, the Reply-To header field "email address" being the email address of an email account separate from the known person of authority and instead, being one accessible to the Internet criminal.

This causes the email to appear to the recipient as if sent from the known person of authority, and when the recipient replies, the "friendly name" name that displays is that of the known person of authority, and secondary to the Reply-To "friendly name" displayed is the Reply-To "email address" of the Internet criminal and not the email address of the known person of authority. The Internet criminal typically uses as the Reply-To email address an address that looks at a glance to be one that is not out of the ordinary, such as ipadmail@mail.com.

Using the email headers defined by RFC0822 and RFC5322 in the above manner, the replies are directed to the Internet criminal's email account mailbox via normal Internet protocol message sending as the address noted in the Reply-To field (i.e. ipadmail@mail.com).

The Internet criminal then engages in back-and-forth communication with the target recipient masquerading as the known person of authority. This is effective as the more the correspondence occurs back-and-forth, the more trusting the target recipient becomes; all-the-while avoiding any correspondence reaching the authentic email address of the known person of authority.

The Internet criminal, using widely accessible email client software such as Microsoft® Outlook®, can configure their email account to download email to their Microsoft Outlook desktop email client, and further sets their Microsoft Outlook desktop email client such that the Internet criminal is able to reply to the reply received from the original intended recipient (in this example, the known administrator who has access to transfer money). The original intended recipient can further reply and each of their replies will be configured with the email formatted just as the original mail was formatted. Therefore, the Internet criminal can effectively engage in a back-and-forth communication with the original intended recipient, purporting to be the known sender, and effectively siphoning off the email replies, all by way of exploiting normal Internet email protocols.

Internet criminals carefully compose the content and context of a message to use job titles and writing styles that may be used by the known person of authority, or that are typical of someone in his or her job title. In this way, the email messages appear even more authentic to the known administrator who has access to transfer money, or at least the content that does not seem far from ordinary. Thus, the Internet criminal can correspond back-and-forth with the known administrator who has access to transfer money purporting to be the known person of authority, with the appearance of being the known person of authority, and yet the actual known person of authority never receives any of the reply correspondence.

The Internet criminal may further exploit RFC5322 and RFC0822 by changing the Sender header email address to be one of a server or sender other than the From email address so that if there are notifications automatically generated by the recipient mail server, such as delivery status notifications. Therefore, those notifications are returned to the Internet criminal instead of the known person of authority email address mailbox.

Various software programs, such as email client software Microsoft Outlook and Gmail, permit ordinary users to configure their email address to perform the above described Reply-To Whaling scheme. In practice, the Internet criminal may use configurable open source email servers such as APACHE or SENDMAIL to automate much of the process.

To protect against Whaling attacks, there are software programs that a known person of authority ("Sender") can use when sending email to a known administrator ("Recipient") who has access to transfer money such that the Recipient can verify that it is an authentic email from the sender, such as public key infrastructure digital certificates and email encryption and email encryption reply functions. These require sender and recipient software installation and recipient user education.

There are software programs to protect against a Whaling attack that a Recipient can be educated to use to verify that the message originated at the location of the Sender and is an authentic message from the Sender, such as public key infrastructure digital certificates and email encryption. These require sender and recipient software installation and recipient user education.

The Sender Policy Framework (SPF) is a simple email-validation system designed to detect email spoofing by providing a mechanism to allow receiving mail exchangers to check that incoming mail from a domain comes from a host authorized by that domain's administrators. However, SPF will not detect Reply-To Whaling schemes.

There are also software programs that can detect if a hypertext link in an email is an authentic hypertext link (the underlying URL is the same as the display name URL). However, these software programs do not address the above mentioned exploitation of the Reply-To header field as described in RFC0822.

What is needed to protect individuals that do not have a high level of technical understanding yet may have a high level of accounting knowledge and general trust of a known person of authority who may instruct the individual (known administrator who has access to transfer money) is a means for the individual to be automatically alerted as to whether there is the possibility of an exploitation of the Reply-To header field as defined in RFC0822 for the purpose of whaling which could result in financial transfers made by the administrator who has access to transfer money to the Internet criminal's account.

Persons skilled in the art of email and other types of messaging systems that operate on and through a network, such as the Internet, understand that there is a need to improve the functioning of such email and messaging systems by providing a system that can detect and mitigate fraudulent identity based attacks on the integrity of those systems. Thus, there has been a need to solve a problem inherent in the email and messaging systems operating in a network environment due the addressing protocols of those systems.

This invention fulfills this need, and others, by protecting Internet users from the above described methods of Internet crimes often called "whaling", and in particular, "Reply-to Whaling". Other features and advantages of the present invention will become apparent from the following detailed description, taken in conjunction with the accompanying drawings, which illustrate, by way of example, the principles of the invention.

SUMMARY OF THE INVENTION

The following format conventions and definitions will be useful in understanding the description of the various aspects and embodiments of the present invention.

The format of electronic messaging header fields for email, for the "From" and "Reply-To" fields of the received message into a recipient's Inbox are typically of the form:
Schema: "Friendly Name"<emailaddress>
Example: "John Smith"<john@gmail.com>
Consider further the following definitions:
N=Friendly Name, or Name
A=Email Address, or Address
$N_F$="From" email header "Friendly Name" on email intended to be received into target recipient inbox.
$A_F$="From" email header "Email Address" on email intended to be received into target recipient inbox.
$N_R$="Reply-To" email header "Friendly Name" on email intended to be received into target recipient inbox.
$A_R$="Reply-To" email header "Email Address" on email intended to be received into target recipient inbox.

All references to email header and to "Email Header . . . on Received Email into Recipient Inbox" means the email header on the email message received into the recipient's inbox, and not any new email headers that may be added to a message after one initiates a reply or message forward. For further clarity, the message headers to parse, as noted below, are those in the original received email into the recipient's inbox and not those new headers that may be placed in a reply or forwarded message after the recipient may click the reply or forward buttons. Reference to the REPLY action could be the REPLY or REPLY-ALL action.

Further, the term email may be construed as electronic message. The term Email header may be construed as transport message headers, email headers, electronic message headers, mail headers, and other similar headers or address fields associated with any electronic communications transport protocol.

In its most general aspect, the present invention includes an electronic messaging system, including an emailing system that reviews content of inbound messages, verifies elements of header fields, and initiates an action if elements of header fields do not match, those elements being $A_F \neq A_R$. In another aspect, the initiated action is an alert message. In another aspect, the initiated action is moving the message to a different folder. In yet another aspect, the initiated action is sending an alert to both the email address in the TO and FROM email header fields. In another aspect, the emailing system parses content of inbound message headers after the recipient clicks the REPLY button. In another aspect, the emailing system parses content of inbound message headers after the recipient clicks the REPLY-ALL button. In another aspect, the emailing system parses content of inbound message headers after the recipient clicks the FORWARD button. In another aspect, the emailing system reviews, parses or verifies content of outbound message headers after the recipient has replied or forwarded the original received email.

In another general aspect, the present invention includes an electronic messaging system, including an emailing system that reviews, parses, or verifies content of inbound message elements of header fields, and initiates an action if elements of header fields match or do not match, those elements being $N_F=N_R$ and $A_F \neq A_R$. In another aspect, the initiated action is an alert message. In another aspect, the initiated action is moving the message to a different folder. In yet another aspect, the initiated action is sending an alert to both the email address in the TO and FROM email header fields. In another aspect, the emailing system reviews, parses or verifies content of inbound message headers after the recipient clicks the REPLY button. In another aspect, the emailing system reviews, parses or verifies content of inbound message headers after the recipient clicks the REPLY-ALL button. In another aspect, the emailing system reviews, parses or verifies content of inbound message headers after the recipient clicks the FORWARD button. In another aspect, the emailing system reviews, parses or verifies content of outbound message headers after the recipient has replied or forwarded the original received email.

In an alternative aspect, the present invention includes an email client programmed by software commands to review content of inbound messages, parse or verify elements of header fields, and initiate an action if elements of header fields do not match, those elements verified being $A_F \neq A_R$. In another aspect, the initiated action is an alert message. In another aspect, the initiated action is moving the message to a different folder. In another aspect, the initiated action is sending an alert to both the email address in the TO and FROM email header fields. In another aspect, the emailing system reviews, parses or verifies content of inbound message headers after the recipient clicks the REPLY button. In another aspect, the emailing system reviews, parses or verifies content of inbound message headers after the recipient clicks the REPLY-ALL button. In another aspect, the emailing system reviews, parses or verifies content of inbound message headers after the recipient clicks the FORWARD button. In another aspect, the emailing system reviews, parses or verifies content of outbound message headers after the recipient has replied or forwarded the original received email.

In an alternative aspect, the present invention includes an email client programmed using software commands that reviews content of inbound messages, parses or verifies elements of header fields, and initiates an action if elements of header fields match or do not match, those elements verified being $N_F=N_R$ and $A_F \neq A_R$. In another aspect, the initiated action is an alert message. In another aspect, the initiated action is moving the message to a different folder. In another aspect, the initiated action is sending an alert to both the email address in the TO and FROM email header fields. In another aspect, the emailing system reviews, parses or verifies content of inbound message headers after the recipient clicks the REPLY button. In another aspect, the emailing system reviews, parses or verifies content of inbound message headers after the recipient clicks the REPLY-ALL button. In another aspect, the emailing system reviews, parses or verifies content of inbound message headers after the recipient clicks the FORWARD button. In another aspect, the emailing system reviews, parses or verifies content of outbound message headers after the recipient has replied or forwarded the original received email.

In yet another aspect, the present invention includes an emailing system with a server separate from the sender that reviews content of inbound messages on the server, and executes the following commands: if $A_R \neq$ Null (empty field) then go to step 2, otherwise process the message in a normal manner; 2. If $N_F=N_R$ and $A_F \neq A_R$, then go to step 3, otherwise process the message in a normal manner, 3. Perform special action on the message. In one aspect, the initiated action is an alert message. In another aspect, where the initiated action is moving the message to a different folder. In another aspect, the initiated action is sending an alert to both the email address in the TO and FROM email header fields. In still another aspect, examples of special actions are to mark the message with an alert or other marking and then process the message by sending it to the recipient, quarantine the message, put the message into a special folder, add a header to the message, delete the message, send a separate message to the From message header email address and the To message header email address, or other actions other than or in addition to normal message sending. In another aspect, the emailing system reviews, parses or verifies content of inbound message headers after the recipient clicks the REPLY button. In another aspect, the emailing system reviews, parses or verifies content of inbound message headers after the recipient clicks the REPLY-ALL button. In another aspect, the emailing system reviews, parses or verifies content of inbound message headers after the recipient clicks the FORWARD button. In another aspect, the emailing system reviews, parses or verifies content of outbound message headers after the recipient has replied or forwarded the original received email.

In still another aspect, the present invention includes an email client programmed using software commands that reviews content of inbound messages, parses or verifies elements of header fields, and initiates an action if elements of header fields do not match, those elements verified being $A_F \neq A_R$. In another aspect, the initiated action is an alert message. In another aspect, the initiated action is moving the message to a different folder. In yet another aspect, the initiated action is sending an alert to both the email address in the TO and FROM email header fields. In still another aspect, examples of special actions are to mark the message with an alert or other marking and then process the message by sending it to the recipient, quarantine the message, put the message into a special folder, add a header to the message, delete the message, send a separate message to the From message header email address or the To message header email address, or both, or other actions other than or in addition to normal message sending. In another aspect, the initiated action is sending an alert to both the email address in the TO and FROM email header fields. In another aspect, the emailing system reviews, parses or verifies content of inbound message headers after the recipient clicks the REPLY button. In another aspect, the emailing system reviews, parses or verifies content of inbound message headers after the recipient clicks the REPLY-ALL button. In another aspect, the emailing system reviews, parses or verifies content of inbound message headers after the recipient clicks the FORWARD button. In another aspect, the emailing system reviews, parses or verifies content of outbound message headers after the recipient has replied or forwarded the original received email.

In yet another aspect, the present invention includes an email client programmed using software commands that reviews content of inbound messages after the email client user initiates a reply to a received message, verifies elements of header fields, and initiates an action if elements of header fields do not match, those elements verified being $A_F \neq A_R$. In another aspect, examples of special actions are to mark the message with an alert or other marking and then process the message by sending it to the recipient, quarantine the message, put the message into a special folder, add a header to the message, delete the message, send a separate message to the From message header email address and the To message header email address, or other actions other than or in addition to normal message sending.

In still another aspect, the present invention includes a system that includes an email client programmed using software commands that reviews content of inbound messages after the email client user initiates an action to a received message, the software verifying elements of header fields, and initiating an action if elements of header fields match or do not match, those elements verified being $N_F = N_R$ and $A_F \neq A_R$. In another aspect, examples of the end user initiated action are opening the message, replying to the message, forwarding the message or viewing the message.

In yet another aspect, the invention includes an emailing system with a server separate from the sender that reviews content of inbound messages on the server, and if $A_R \neq Null$ (empty field) and if $N_F = N_R$ and if $A_F \neq A_R$, perform a special action on the message, otherwise process message in normal manner. In one aspect, the initiated action is an alert message. In another aspect, the initiated action is moving the message to a different folder. In yet another aspect, the initiated action is sending an alert to both the email address in the TO and FROM email header fields. In still another aspect, where examples of special actions are to mark the message with an alert or other marking and then process the message by sending it to the recipient, quarantine the message, put the message into a special folder, add a header to the message, delete the message, send a separate message to the From message header email address and the To message header email address, or other actions other than or in addition to normal message sending.

In still another aspect, the present invention includes an mail system including hardware and software executing programming commands that reviews content of inbound messages, and if $A_R \neq Null$ (empty field) and if $N_F = N_R$ and if $A_F \neq A_R$, perform a special action on the message, otherwise process message in normal manner.

In yet another aspect, the present invention includes an email system including hardware and software executing programming commands that reviews content of inbound messages, and if $A_F \neq A_R$ then perform a special action on the message, otherwise process message in normal manner. In one aspect, the initiated action is an alert message. In another aspect, the initiated action is moving the message to a different folder. In still another aspect, the initiated action is sending an alert to both the email address in the TO and FROM email header fields.

In yet another aspect, the present invention includes an email system including hardware and software executing programming commands that reviews content of outbound messages after a reply or forward of the original inbound received message but before delivery of the reply or forward to its addressed recipient; and if on the original inbound received email before the reply or forward, $A_F \neq A_R$ or if $A_R \neq Null$ (empty field) and if $N_F = N_R$ and if $A_F \neq A_R$, or if $N_F = N_R$ and if $A_F \neq A_R$, then perform a special action on the message, otherwise process message in normal manner. In one aspect, the initiated action is an alert message. In another aspect, the initiated action is moving the message to a different folder. In still another aspect, the initiated action is sending an alert to both the email address in the TO and FROM email header fields.

In yet another aspect, the present invention includes an emailing system having a server including hardware and software executing programming commands, the server being separate from the sender that reviews content of inbound messages on the server, and if $A_F \neq A_R$, performs a special action on the message, otherwise process message in normal manner. The system has the initiated action be displaying an alert message. The system may also have the initiated action be moving the message to a different folder. The system may further have the initiated action be sending an alert to both the email address in the TO and FROM email header fields. In yet another aspect, the review of message header could be the following: if $A_R \neq Null$ (empty field) and if $N_F = N_R$ and if $A_F \neq A_R$, or if $N_F = N_R$ and if $A_F \neq A_R$.

In yet another aspect, the present invention includes an emailing system including hardware and software executing programming commands that includes an email client responsive to programming commands, the email client reviews content of inbound messages after the email client user initiates an action to a received message, the software verifying elements of header fields, and the system initiating an action if elements of header fields match or do not match, those elements verified being $A_F \neq A_R$. The system may further have the user initiated action be clicking a REPLY button in the email client user interface. The system may further have the system initiated action be displaying an alert message. The system may further have the system initiated action be moving the message to a different folder. The system may further have the system initiated action be sending an alert to both the email address in the TO and FROM email header fields.

In yet another aspect, the present invention includes an emailing system including hardware and software executing programming commands that includes an email client that reviews content of inbound messages after the email client user initiates an action to a received message, the software verifying elements of header fields, and software initiating an action if elements of header fields match or do not match, those elements verified being if $A_R \neq Null$ (empty field) then go to step 2, otherwise process message in normal manner; 2. If $N_F = N_R$ and $A_F \neq A_R$, then go to step 3, otherwise process message in normal manner, 3. Perform action on the message. The system may further have the user initiated action be clicking a REPLY button in the email client user interface. The system may further have a system initiated action be displaying an alert message. The system may further have a system initiated action be moving the message to a different folder. The system may further have a system initiated action be sending an alert to both the email address in the TO and FROM email header fields. The system may further have a system initiated action be sending an alert to both the email address in the TO and FROM email header fields.

In still another aspect, the present invention includes an emailing system comprising: a processer programmed using programming commands to review content of inbound messages, verify elements of the email header fields of the inbound message, and to initiate an action if the elements of the header fields match or do not match; wherein the elements being analyzed are $N_F = N_R$ and $A_F \neq A_R$. In one alternative aspect, the initiated action is an alert message. In another alternative aspect, the initiated action is moving the message to a different folder resident in a memory associated with processor. In yet another alternative aspect, the initiated action is sending an alert to both an email address in a TO and a FROM email header field of the inbound message.

In yet another aspect, the present invention includes an emailing system, comprising: a server separate from a sender email client, the server programmed using programming commands to review content of inbound messages to the server, the programming commands of the server configured to execute the following commands: if $A_R \neq$ Null (empty field) and If $N_F = N_R$ and $A_F \neq A_R$, perform a special action on the message, otherwise process the inbound message in a normal manner. In one alternative aspect, the special action is an alert message. In another alternative aspect, the special action is moving the message to a different folder. In still another alternative the special action is sending an alert to both the email address in the TO and FROM email header fields of the inbound message. In yet another alternative aspect, the special action may be marking the message with an alert or other marking and then processing the inbound message by sending it to the recipient of the inbound message, quarantining the message, putting the inbound message into a special folder, adding a header to the inbound message, deleting the inbound message, sending a separate message to the From header email address of and the To message header email address of the inbound message, or other actions other than or in addition to normal message sending.

In still yet another aspect, the present invention includes a system including an email client comprising: a processor disposed in the email client, the processor programmed with programming commands to review content of inbound messages after an end user of the email client initiates an action to a received inbound message, and to verify elements of the received inbound message header fields, and to initiate an action if the elements of the header fields match or do not match; wherein the elements verified are $N_F = N_R$ and $A_F \neq A_R$. In one alternative aspect, the initiated action is one or more actions are selected from the group of actions consisting of opening the message, replying to the message, replying-all to the message, forwarding the message, and viewing the message.

In still another aspect, the present invention includes an emailing system having a server separate from a sender, comprising: a processor programmed using programming commands to review content of an inbound message received by the server, the processor programmed to determine if $A_R \neq$ Null (empty field) and if $N_F = N_R$ and if $A_F \neq A_R$, the processor being further programmed using programming commands to perform a special action on the message, otherwise the processor is programmed to process the inbound message in normal manner. In another alternative aspect, the special action is an alert message. In still another aspect, the special action is moving the message to a different folder. In still another alternative aspect, the special action is sending an alert to both the email address in the TO and FROM email header fields of the inbound message. In yet another alternative aspect, the special action is one or more of actions selected from the group of actions consisting of marking the inbound message with an alert or other marking and then processing the inbound message by sending it to the recipient, quarantining the inbound message, putting the inbound message into a special folder, adding a header to the inbound message, deleting the inbound message, sending a separate message to the From message header email address and the To message header email address of the inbound message, or any other actions other than or in addition to normal message sending.

In another aspect, the present invention includes an email system, comprising: a processor programmed using programming commands to review content of headers of inbound messages, and if the processor determines that $A_R \neq$ Null (empty field) and if $N_F = N_R$ and if $A_F \neq A_R$, the processor is programmed to perform a special action on the inbound message, otherwise the processor is programmed to process the inbound message in a normal manner.

In yet another aspect, the present invention includes an email system comprising: a processor programmed using programming commands to review content of headers of inbound messages, and if the processor determines that $A_F \neq A_R$, the processor is programmed to perform a special action on the inbound message, otherwise the processor is programmed to process the inbound message in a normal manner. In one alternative aspect, the special action is an alert message. In another alternative aspect, the special action is moving the message to a different folder. In yet another aspect, the special action is sending an alert to both the email address in the TO and FROM email header fields.

In still another aspect, the present invention includes an emailing system with a server separate from a sender, comprising: a processor programmed by programming commands to review content of an inbound message on the server, and if the processor determines that $A_F \neq A_R$, the processor is programmed to perform a special action on the inbound message, otherwise the processor is programmed to process the inbound message in a normal manner. In one alternative aspect, the special action is an alert message. In another alternative aspect, the special action is moving the message to a different folder stored in a memory associated with the processor. In yet another aspect, initiated action is sending an alert to either the email address in the TO or FROM email header fields of the inbound message, or to send the alert to the email address of both the To and From email header fields of the inbound message.

In another aspect, the present invention includes a system having an email client, comprising: a processor disposed in the email client, the processor programmed with programming commands to review content of inbound messages after an end user of the email client initiates an action to a received inbound message, and to verify elements of the received inbound message header fields, and to initiate an action if the elements of the header fields match or do not match; wherein the elements verified are $A_F \neq A_R$. In one alternative aspect, action is clicking a REPLY button, a REPLY-ALL button, or a FORWARD button in a user interface of the email client. In another aspect, the action is displaying an alert message. In another aspect, the action is moving the message to a different folder stored in a memory associated with the processor. In yet another aspect, the action is sending an alert to both the email addresses in the TO and FROM email header fields of the inbound message.

In still another aspect, the present invention includes a system having an email client, comprising: a processor disposed in the email client, the processor programmed using programming commands to review content of an inbound message after the user of the email client initiates an action to the inbound message, the programming commands of the processor configured to determine if $A_R \neq$ Null (empty field) and If $N_F = N_R$ and $A_F \neq A_R$, perform a special action on the message, otherwise process the inbound message in a normal manner. In one aspect, the user initiated action is clicking a REPLY button in the email client user interface. In another aspect, the special action is displaying an alert message. In still another aspect, the special action is moving the message to a different folder stored in a memory associated with the processor. In yet another alternative aspect, the special action is sending an alert to both the email address in the TO and FROM email header fields. In still another alternative aspect, the special action is sending an alert to both the email address in the TO and FROM email header fields of the inbound message.

In another aspect, the present invention includes an emailing system having a server disposed on an outbound message path toward an email address contained in an originally received reply-to message header address, the server being separate from a recipient having the reply-to email address, comprising: a processor associated with the server, the processor programmed using programming commands to review content of an inbound message received by the server, the processor programmed to determine if $A_R$ Null (empty field) and if $N_F=N_R$ and if $A_F \neq A_R$, the processor being further programmed using programming commands to perform a special action on the message, otherwise the processor is programmed to process the inbound message in normal manner.

In yet another aspect, the present invention includes an emailing system with a server disposed on an outbound message path, the server separate from a forward recipient, comprising: a processor associated with the server, the processor programmed using programming commands to review content of a message received on the server from an original recipient of the message, the message having been forwarded by the original recipient to a forward recipient, the processor also being programmed to analyze message headers of the received message, and if $A_R \neq$ Null (empty field) and if $N_F=N_R$ and $A_F \neq A_R$, the processor being further programmed using programming commands to perform a special action on the message, otherwise the processor is programmed to process the inbound message in normal manner.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The invention will now be described in relation to the accompanying drawings in which.

DETAILED DESCRIPTION OF THE EMBODIMENTS

Figure 1:
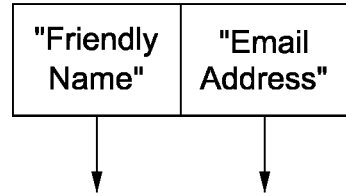
FIG. 1 is a graphic illustrating the From and Reply-To message header format of an email.

Certain embodiments as disclosed herein provide an application framework for creating, managing, customizing, and operating systems and methods related to protecting an email user from "whaling" phishing. In one embodiment, the system comprises an application server, a database, a remote server, and a client device. In another embodiment, the whaling protection system may be a plug-in program or service that is resident on a client computer or terminal, cell phone, tablet, and the like. This plug-in may be hardware or software that programmed to carry out the various steps and/or algorithms necessary to provide the user with the advantages of the various embodiments of the invention.

Moreover, the systems and methods of the present invention may be configured to operate in a server environment, wherein the client communicates with the server and/or network gateway through a network, such as the Internet to obtain the advantages of the various embodiments of the invention.

As will be described hereinafter in greater detail, the various embodiments of the present invention relate to a system and method for detecting if a reply to an email will be transmitted to an unintended recipient in the viewpoint of the individual replying. For purposes of explanation, specific nomenclature is set forth to provide a thorough understanding of the present invention. Description of specific applications and methods are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

In the following description, numerous specific details are set forth in order to provide a thorough understanding of the present invention. It will be apparent, however, to one of ordinary skill in the art, that the present invention may be practiced without these specific details. In other instances, well known components or methods have not been described in detail but rather in a block diagram, or a schematic, in order to avoid unnecessarily obscuring the present invention. Further specific numeric references such as "first," may be made. However, the specific numeric reference should not be interpreted as a literal sequential order but rather interpreted that the "first" is different than a "second." Thus, the specific details set forth are merely exemplary. The specific details may be varied from and still be contemplated to be within the spirit and scope of the present invention.

Further, while the invention uses the term server, this may in practice be a network of servers on one or more physical devices, or be part of a server function or configuration, or be a computer or computing device.

Throughout the description reference will be made to various software programs and hardware components, servers, computers, computing devices (machine-readable medium) that provide and carryout the features and functions of the various embodiments of the present invention. It will be understood that the methods and processes of the various embodiments of the invention, while running on typical hardware components, control those components in such a manner that the components carry out the specialized processes of hardware that has been specifically constructed to carry out those processes. Moreover, using the methods and processes of the various embodiments of the invention result in an improvement to transmission of emails through a network (such as, for example, the Internet) in that they provide for detection of Whaling phishing attacks and mitigation of losses of valuable and private information belonging to a victim of such attacks.

Software programs may be embedded onto a machine-readable medium. A machine-readable medium includes any mechanism that provides, stores or transmits information in a form readable by a machine, such as, for example, a computer, server or other such device. For example, a machine-readable medium may include read only memory (ROM); random access memory (RAM); magnetic disk storage media; optical storage media; flash memory devices; digital video disc (DVD); EPROMs; EEPROMs; flash memory; magnetic or optical cards; or any type of media suitable for storing electronic instructions.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both. It should be contemplated that the order of operation of the algorithm could be different than the one written herein.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or "inputting" or "parsing" or "reviewing" or "matching" or "verifies" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

In an embodiment, the logic consists of electronic circuits that follow the rules of Boolean Logic, software that contain patterns of instructions, or any combination of both.

Example systems and methods may be better appreciated with reference to flow diagrams. While for purposes of simplicity of explanation, the illustrated methods are shown and describes as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. Blocks may be combined or separated into multiple components. Furthermore, additional and/or alternative methods can employ additional blocks not illustrated.

The various embodiments of the invention described below, for example, can be software commands installed into common email client user interfaces such as Microsoft Outlook, Microsoft Outlook Online, Google® Gmail®, among others. Other embodiments may be implemented using servers such as Apache, Sendmail, Qmail, Openwave Messsaging, Zimbra, Sun, Microsoft® Exchange®, or similar with message transport server functions.

In the case of implementing the embodiments of the invention in Google Gmail, the Google Chrome Browser framework for Chrome Browser Extensions may be used. These Extensions allow one to add the functionality of the embodiments of the invention to Chrome without diving deeply into native code using familiar web development methods such as HTML, CSS, and JavaScript. Using this method, upon the end user selecting a User Interface (UI) element of the web based Google Gmail program viewed using a Chrome Browser, the UI element will call a browser action, which triggers the running of software commands implementing one or more of the embodiments of the invention. For example, opening an email in the Google Gmail program Inbox viewed using a Chrome Browser and clicking the REPLY button in the UI, triggers the an embodiment of the invention to examine the described message headers, matches the described header elements, and depending on the result, triggering a follow-on action. The various embodiments of the invention may be implemented as a Chrome Browser Extension and installed by end users, such as, for example, Google itself, or a third party, as a zipped bundle of files—HTML, CSS, JavaScript, images, and other elements needed to add the desired functionality to the Google Chrome browser. In this instance, the Extension are essentially web pages, and they can use all the APIs that the browser provides to web pages, from XMLHttpRequest to JSON to HTML5. The Extension can interact with web pages or servers using content scripts or cross-origin XMLHttpRequests.

In the case of implementing the various embodiments of the invention in Microsoft Outlook, one example would be to write the software embodying the various embodiments using the Dot-Net framework to create a Microsoft Outlook COM-Add-in or a Microsoft Office Add-in using the Microsoft JavaScript API for Office and HTML5 that enables one to create web applications that interact with the object models in Office host applications. In this manner, an embodiment of the invention runs as an application that references the office.js library, which is a script loader. The office.js library loads the object models that are applicable to the Office application that is running the add-in. One can use these JavaScript object models, HTML5, and Com-Add-In APIs, depending on Microsoft Versions.

Alternatively, the Microsoft.Office.WebExtension namespace (which by default is referenced using the alias Office in code) contains objects that can be used to construct scripts embodying the invention that interact with the UI element that triggers the running of the scripts. For example, opening an email in the Microsoft Outlook email client program Inbox and clicking the REPLY button in the UI can trigger an embodiment of the invention by, for example, examining the described message headers, matching the described header elements, and depending on the result, triggering the described follow-on action. The Microsoft Add-In that contains the embodiment of the invention can be installed by end users for example, by Microsoft itself, or by a third party.

In mobile messaging environments the various embodiments of the invention will operate similarly in programming languages such as, for example, if messaging on devices using Android operating system, programmed using Java, and if messaging on devices using iOS operating system, programmed using objective-c/Swift, and the like.

One embodiment of the invention described below, for example, can be implemented using programming commands installed into common Mail Transport Agent software that is installed on a mail server, email security appliance or email security gateway that is configured to receive inbound email traffic. These programming commands, depending on the version software of Mail Transport Agent and the operating system of the servers, can be written using a variety of programming tools and programming languages or frameworks such as Microsoft's Dot-Net framework, Linux, Unix or the like. The scripts embodying the invention can be written as programming commands that operate on messages that are inside a process of the Mail Transport Agent, mail server, email security appliance or email security gateway, such that the commands are operating as part of a process within these email management functions or as stand-alone applications.

Other embodiments of the invention described may use similar email client, computing device, or server implementations.

FIG. 1 is a graphical representative illustrates the content and format inserted into the electronic message header fields for the fields of a received email. As can be seen, these fields, "From", "Sender", "Reply-To", have two components. These two components are what is commonly referred to as the "Friendly Name" and the "Email Address". The schema of these two parts of these header fields is the following:

Schema: "Friendly Name" <emailaddress>
Example: "John Smith" <john@gmail.com>

The following abbreviations, consistent with RFC5322 and RFC0822, in addition to the definitions set forth above, are used in this description of the various embodiments of the invention and in the diagrams:

"From" Email Header Field on the Received Message into the Inbox;

"Sender" Email Header Field on the Received Message into the Inbox (Note, the "Sender" Email Header Field is different from the Envelope Address also known as the Return-Path Header Field);

"Reply-To" Email Header Field on the Received Message into the Inbox;

The following further terminology is used:

"Known person of authority" may equate to an Authentic Sender "Friendly Name" or Authentic Sender "Email Address;"

"Known administrator who has access to transfer money" may equate to Intended Recipient "Friendly Name" or Intended Recipient "Email Address"; and Internet criminal may equate to an Imposter "Email Address" (which would be placed in the Reply-To message header field).

As discussed previously, Internet criminals exploit the "From" and "Reply-To" email message header fields by using Internet-based research or with non-public information sources and account hacking to identify a target recipient name, job title, and email address, and a sender name, job title, and email address. The Internet criminal often targets a sender known to the recipient as having the authority to direct the recipient to transfer money.

With this information, the Internet criminal exploits the standard internet message format and internet message transmission protocols of RFC5322 and RFC0822 to send the email from Internet criminal's own computer or automated criminal email sending system, with the From header field "friendly name" and From header field "email address" being the "known person of authority", and the Recipient header field "friendly name" and Recipient header field "email address" being the "known administrator who has access to transfer money upon receipt of instructions from the person of authority", and the Reply-To header field "friendly name" being the name of the known person of authority, and uniquely, the Reply-To header field "email address" being the email address of an email account separate from the known person of authority and instead, being one accessible to the Internet criminal.

This causes the email to appear to the recipient as if sent from the known person of authority, and when the recipient replies, the "friendly name" name that displays is that of the known person of authority, and secondary to the Reply-To "friendly name" displayed is the Reply-To "email address" of the Internet criminal and not the email address of the known person of authority. The Internet criminal typically uses as the Reply-To email address an address that looks at a glance to be one that is not out of the ordinary, such as ipadmail@mail.com.

Using the email headers defined by RFC0822 and RFC5322 in the above manner, the replies are directed to the Internet criminal's email account mailbox via normal Internet protocol message sending as the address noted in the Reply-To field (i.e. ipadmail@mail.com).

Figure 2:
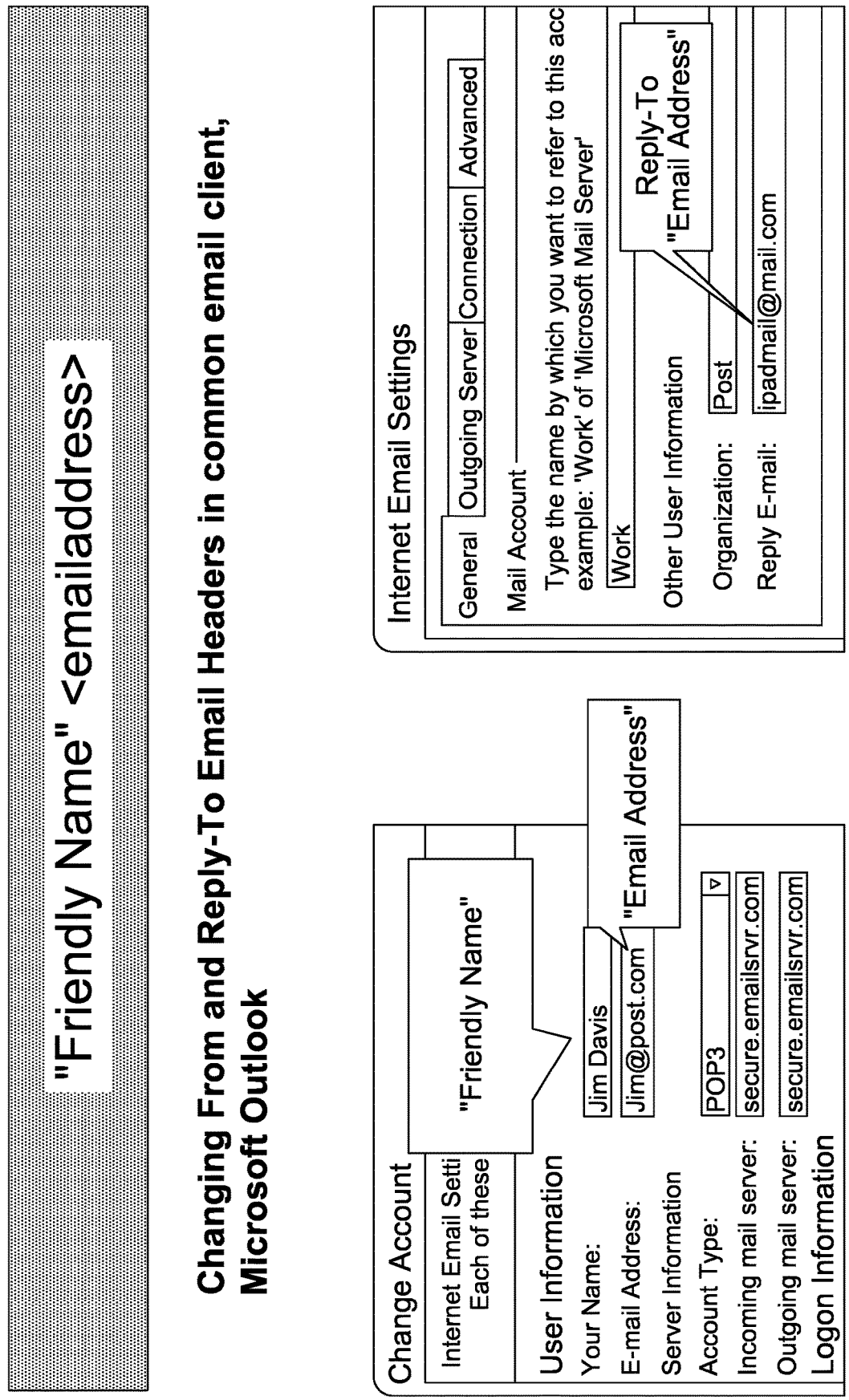
FIG. 2 is a graphic illustrating how a user may change Email Address Format for fields such as the From and Reply-To headers in a Common Email Client.

FIG. 2 is a graphical representation showing how the Friendly Name and Email Address may be changed for the From and Reply-To email headers in a common email client, such as, for example, Microsoft Outlook. Thus an Internet Criminal may send an email with From and Reply-To headers that appear to a recipient of the email that they are replying to a Friendly Name, when in fact the reply is being directed to the Internet Criminal.

Figure 3:
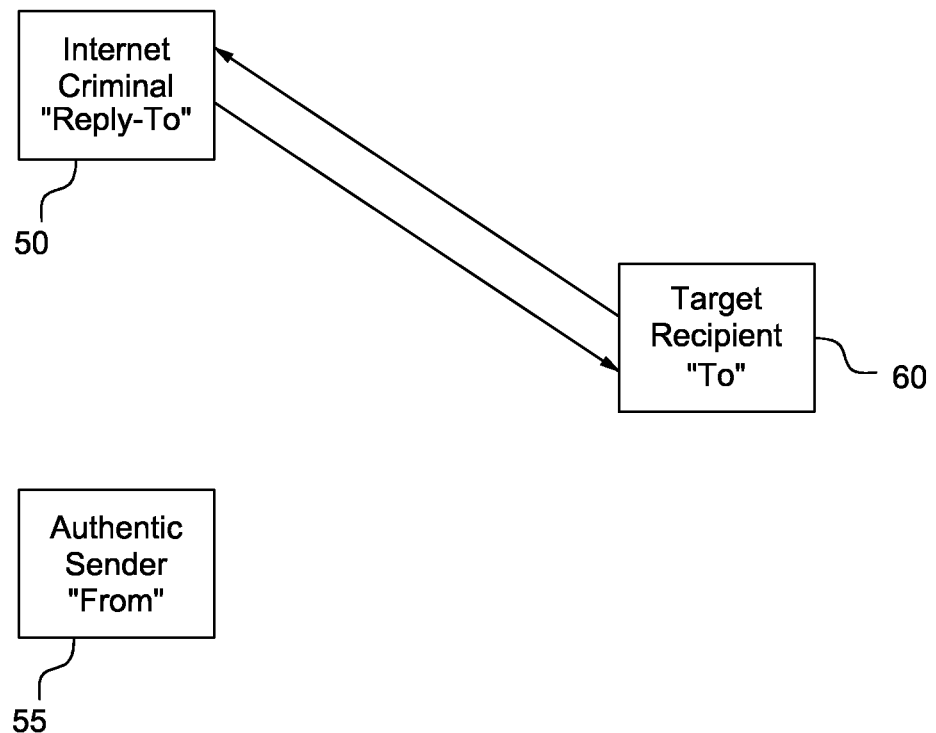
FIG. 3 is a diagram illustrating the email flow in a whaling attack where the Reply-To field has been changed so that a response from the email by a Target Recipient is sent to the altered Reply-To address instead of being directed to an Authentic Sender.

FIG. 3 is a graphical representation of the email information flow during a Whaling phishing attack. In this type of attack, an email is sent by an Internet Criminal 50 to an unsuspecting Target recipient 60. The received email has an Authentic Sender 55 listed in the From header, while the Internet Criminal has entered his own email address into the Reply-To header. Thus the recipient 60 receives the email, and if he or she wishes to respond to the email, presses the "Reply" button on their email client and sends a reply not to the Authentic Sender 55, but instead to the Internet Criminal 50.

Figure 4:
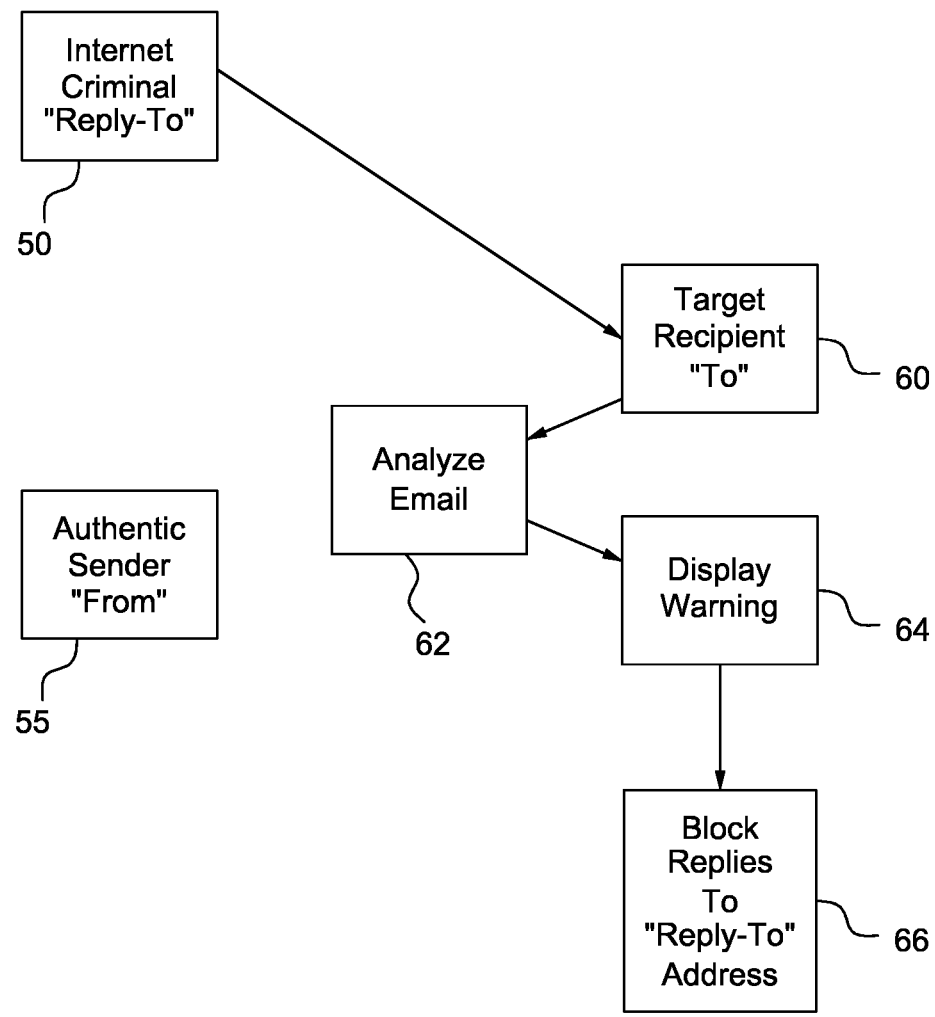
FIG. 4 is a diagram illustrating the email flow in a whaling attack wherein an embodiment of the present invention is employed by the Target Recipient to analyze the email message, detect the spoofed Reply-To field, provide a warning to the Target Recipient, and prevent email flow back to the Internet Criminal Reply-To address.

FIG. 4 is a graphical representation of the email information flow where the Target recipient's email client has a first exemplary embodiment of the invention implemented on the email client. As before, an email is sent by an Internet Criminal 50 to an unsuspecting Target recipient 60. The received email has an Authentic Sender 55 listed in the From header, while the Internet Criminal has entered his own email address into the Reply-To header. In this case, however, when the recipient presses the Reply or Reply To All button on his or her email client, the embodiment of the invention implemented on his or her email client intercepts the command from the Reply or Reply to All button and analyzes the received email. In this case, the email is determined to be fraudulent, and a warning 64 is displayed to the recipient and blocks 66 the desired "reply" from being sent to the Internet Criminal.

Figure 5:
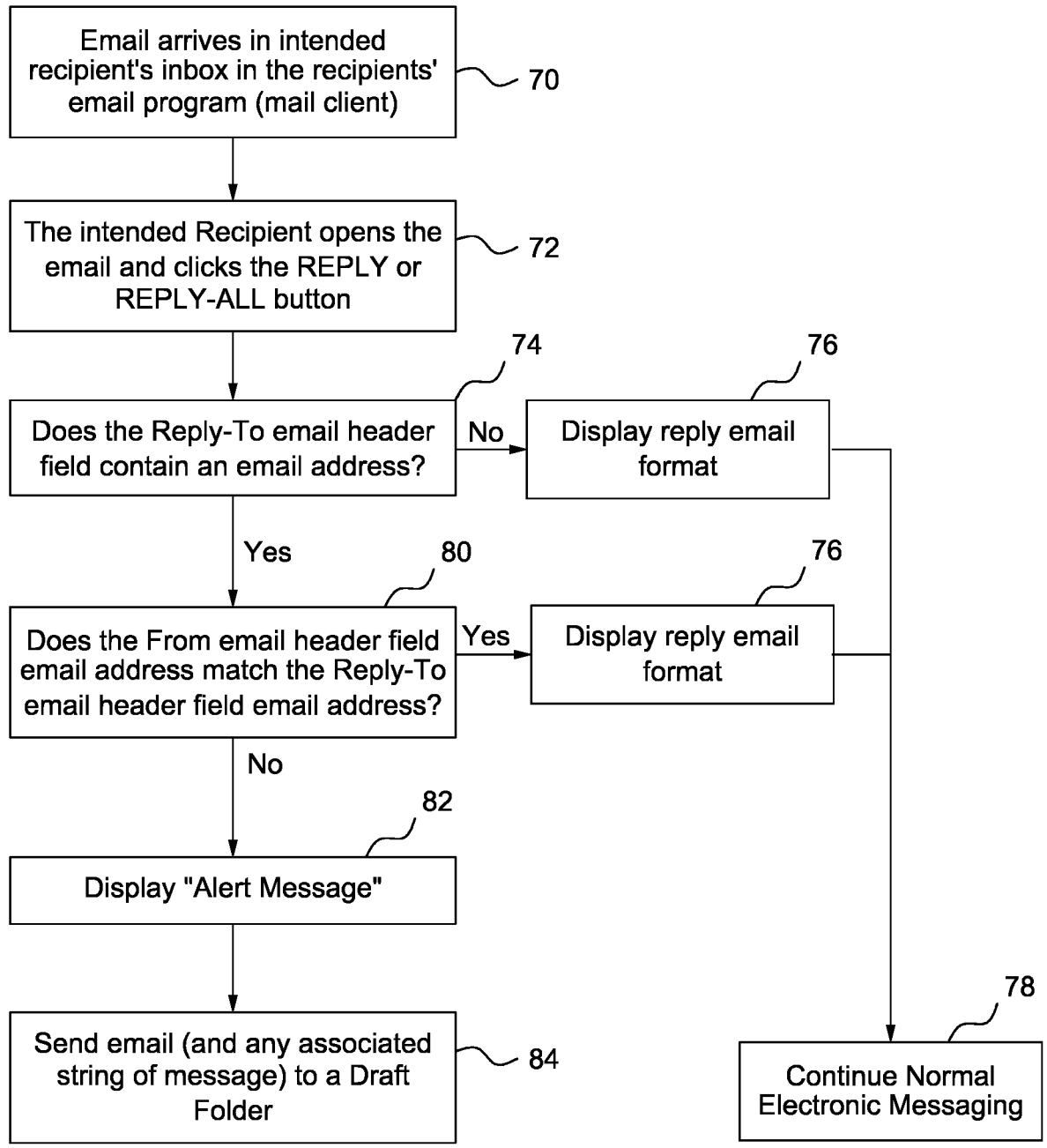
FIG. 5 is a flow diagram illustrating the processes carried out by a first embodiment of the invention.

FIG. 5 is a block diagram illustration the flow of the first exemplary embodiment of the invention discussed above. In this embodiment, the fraudulent email arrives in the target recipient's email inbox of the recipient's email client in box 70. If the target recipient opens the email and then clicks on the Reply or Reply-All buttons of the email client in box 72, the command to compose a reply message is intercepted by the programming commands of the first embodiment of the invention, and they analyzed to determine if the Reply-To email header field of the message contains an email address in box 74. If the Reply-To email header field does not contain an email address, the programming commands of the first embodiment of the invention terminate and the email client displays a typical reply email message format to the recipient in box 76 and the process continues with normal electronic messaging in box 78.

If the Reply-To email header field does contain an email address in box 74, then in box 80, the email headers are further analyzed to determine if the email address contained in the From email header field matches the email address contained in the Reply-To email header field. If the email addresses of the From field and the Reply-To fields match, then the process is terminated and the typical reply email format is displayed to the recipient in box 76.

If the From email address does not match the Reply-To email address, an alert message is displayed to the recipient in box 82, and the received email, along with any other messages associated with the received message, such as, for example, a string of other email messages or attachments, is sent to a quarantine or draft folder of the recipient's mail client in box 84.

Various warning messages may be provided to the recipient when a fraudulent email message is received. For example the alert message may be: "Caution: Your reply email will be routed to someone other than the displayed original email sender. This could cause your message to be routed to an unknown third party. Would you like to continue with your reply? A Yes/No button may also be provided to the recipient, allowing the recipient to bypass the blocking of the reply to the fraudulent message if desired if "Yes" is selected, or if "No" is selected, move the message reply and its message string (associated messages) in the draft folder (or other folder) of the mail client, and add a second alert message that states, for example: "The message in question has been moved to the Quarantine or Draft (or other) folder for the recipient to further review.

Figure 6:
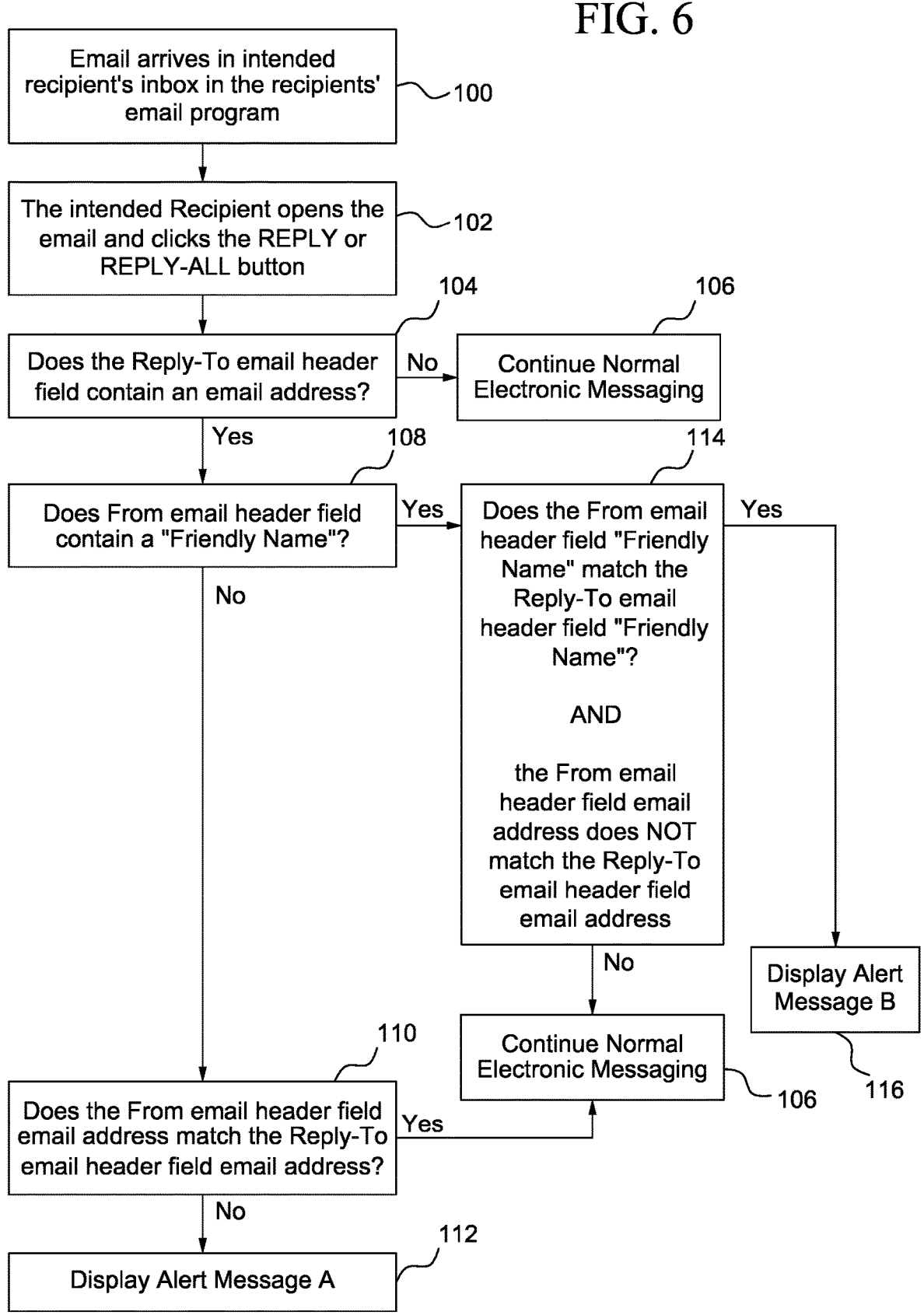
FIG. 6 is a illustrating the processes carried out by a second embodiment of the invention.

FIG. 6 is a flow chart illustrating the processes carried out by a second embodiment of the invention. In this embodiment, the recipient desires a higher level of risk mitigation to avoid responding to a fraudulent received email message.

In this embodiment, the fraudulent email arrives in the target recipient's email inbox of the recipient's email client in box 100. If the target recipient opens the email and then clicks on the Reply or Reply-All buttons of the email client in box 102, the command to compose a reply message is intercepted by the programming commands of the first embodiment of the invention, and they analyzed to determine if the Reply-To email header field of the message contains an email address in box 104. If the Reply-To email header field does not contain an email address, the programming commands of the second embodiment of the invention terminate and the email client displays a typical reply email message format to the recipient, and then continues with normal electronic messaging in box 106.

If the Reply-To email header field does contain an email address in box 104, then in box 108, the email headers are further analyzed to determine if the email address contained in the From email header field contains a "Friendly Name". If the From email address in the From email header field is a "Friendly Name" and matches a "Friendly Name" contained in the Reply-To email header, and the email address contained in the From email header field does not match the email address contained in the Reply-To email header field in box 114, the logic set forth in box 114 is true, and alert message B is displayed to the recipient. On the other hand, if the logic set forth in box 114 is false, then the email client displays a typical reply email message format to the recipient and then continues with normal electronic messaging in box 106.

If the From email header field does not contain a "Friendly Name" as determined in box 108, the process then determines if the email address contained in the From email header field matches the email address contained in the Reply-To email header field in box 110. If the email addresses of the From field and the Reply-To fields match, then the process terminates and continues normal electronic messaging in box 106. If they do not match, alert message A is displayed to the recipient.

Various warning messages may be provided to the recipient when a fraudulent email message is received. For example the contents of alert message A may be: "Caution: Your reply email will be routed to someone other than the displayed original email sender. This could cause your message to be routed to an unknown third party. Would you like to continue with your reply?" A Yes/No button may also be provided to the recipient, allowing the recipient to bypass the blocking of the reply to the fraudulent message if desired if "Yes" is selected, or if "No" is selected, move the message reply and its message string (associated messages) in the draft folder (or other folder) of the mail client, and add a second alert message that states, for example: "The message in question has been moved to the Quarantine or Draft (or other) folder for the recipient to further review."

Similarly, the contents of alert message B may be: be: "Caution: Your reply email will be routed to someone other than the displayed original email sender. This could cause your message to be routed to an unknown third party. Would you like to continue with your reply?" A Yes/No button may also be provided to the recipient, allowing the recipient to bypass the blocking of the reply to the fraudulent message if desired if "Yes" is selected, or if "No" is selected, move the message reply and its message string (associated messages) in the draft folder (or other folder) of the mail client, and add a second alert message that states, for example: "The message in question has been moved to the Quarantine or Draft (or other) folder for the recipient to further review."

Where the user wants a higher level of risk mitigation automated with actions taken before the sent message from the Internet criminal reaches that target recipient, software embodying a third embodiment of the invention may be installed on a server separate from the sender that receives email before reaching the target recipient email box.

Figure 7:
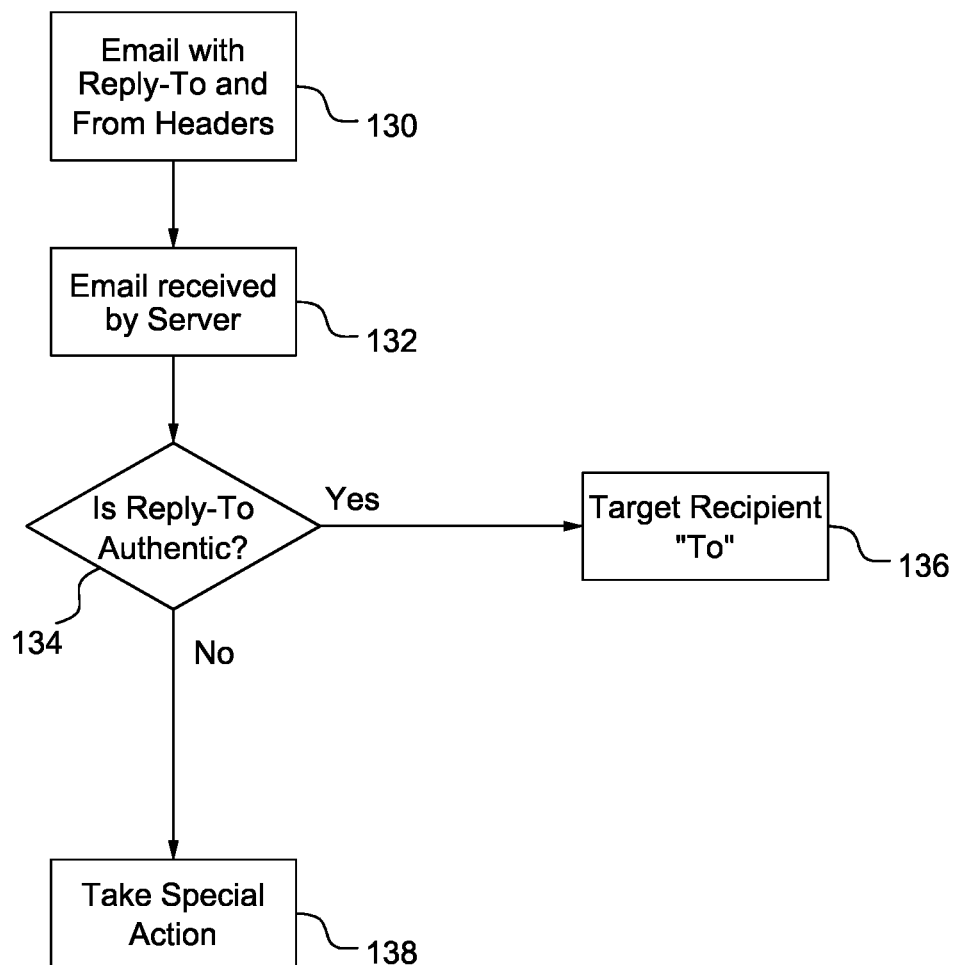
FIG. 7 is a diagram illustrating the email flow in a whaling attack wherein another embodiment of the invention is employed by a server separate from the sender receives an email from a sender, the email having a fraudulent Reply-To address, to analyze the email and take an action on the email dependent on whether the email is from an authentic sender or not.

FIG. 7 is a graphic representation of email flow in the case where an email appears to come from an authentic sender, but in actuality comes from an Internet Criminal. Here, an email is sent from the Internet Criminal with Authentic Sender "From" information, and with the Internet Criminal's "Reply-To" information to a target recipient in box 130. The email is intercepted by a server that is located remote from the sender's email client in box 132. The server, operated by programming commands embodying the third embodiment of the invention, analyzes the header information of the email at box 134. If the server determines that the email is not fraudulent, the email is passed by the server to the target recipient at box 136. If the server determines that the email is fraudulent, the server does not send the email to the recipient, but instead takes special action on the email, such as quarantining the email in a data base for further analysis or other action.

Figure 8:
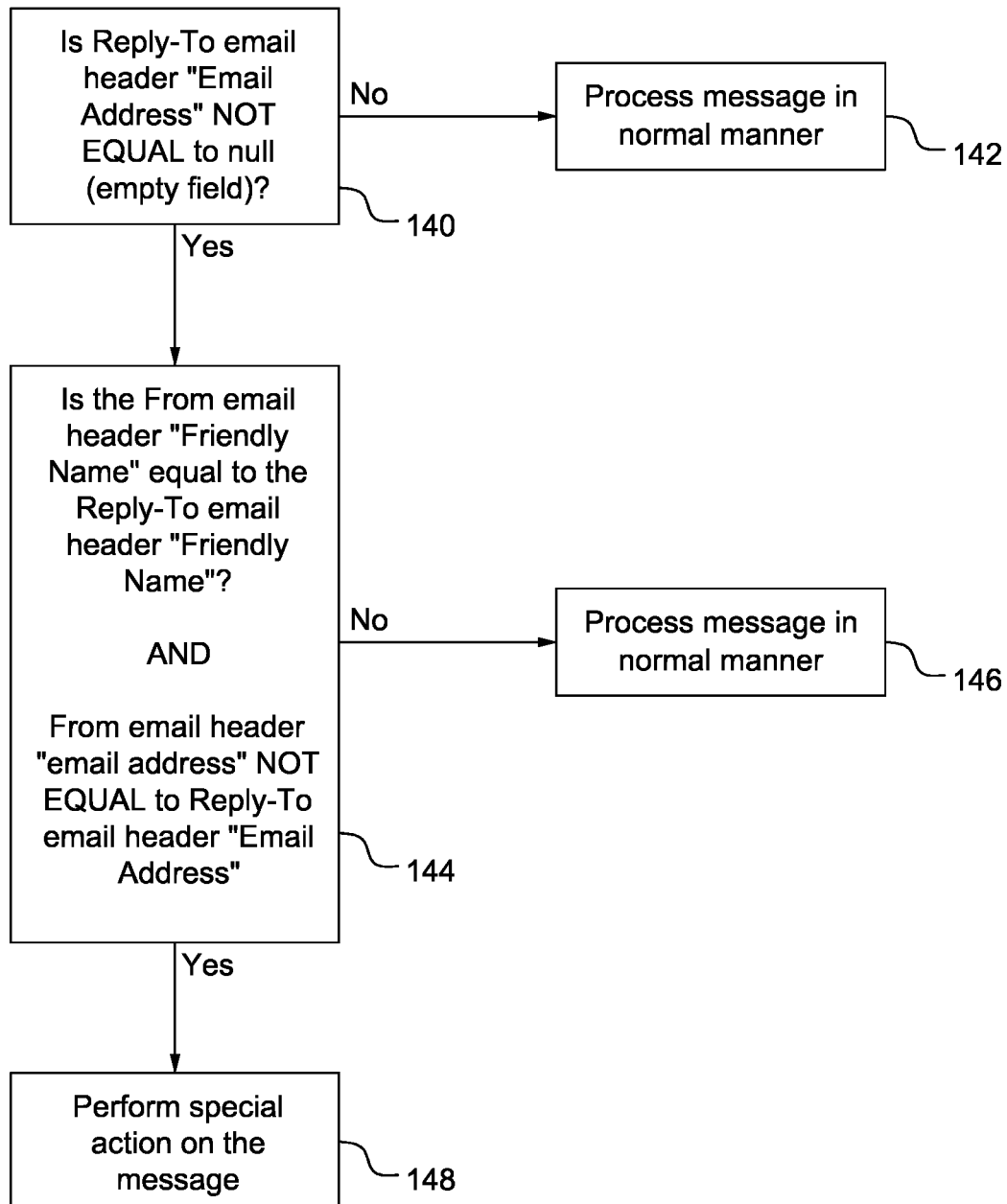
FIG. 8 is a flow diagram the processes carried out by a third embodiment of the invention.

FIG. 8 is a flow chart illustrating the various methods, processes, and logic carried out by the third embodiment of the invention. As stated previously, these methods, processes, and logic are embodiment in software and hardware that comprise a server that is located remotely from a sender's (whether authentic or criminal) email client.

When an email is received at the server, the server analyzes the email in box 140 to determine if email address in the Reply-To header is empty (a null field). If Reply-To header is empty, the email is processed in a normal manner in box 142 and transmitted to the indicated recipient of the email.

If there is an email address in the Reply-To email header, the email is further analyzed in box 144 to determine if the email is fraudulent. As set forth in box 144, if the From email header contains a "Friendly Name" and is the same as the contents of the Reply-To email header, and if the email address contained in the From email header is not the same as the email address contained in the Reply-To email header, the server determines that the email may be fraudulent, and performs a special action, such as that mentioned above, on the message. If the logical result of the logic contained in box 144 is determined to be false, then the message is determined to be an actual, non-fraudulent, message, and is transmitted to the indicated recipient of the message in box 146. Special actions that may be taken by the server are, for example, marking the message with an alert or other marking and then processing the message by sending it to the recipient, quarantining the message, putting the message into a special folder, adding a header to the message, deleting the message, sending a separate message to the From message header email address and the To message header email address, or taking other actions other than or in addition to normal message sending.

An additional example of a possible special action may to transmit the message that has been determined to possibly fraudulent to the indicated recipient containing an alert message, such as, for example, "Warning: It is very likely that your reply email will be routed to someone other than the displayed email sender. This could cause your message to be routed to an unknown third party. We recommend that you investigate further before replying and that you contact your IT administrator with this message. Would you like to continue with your reply? [Yes/No button]". If "Yes" is selected, then the email message reply email format is displayed. In "No" is selected, then one possible action would be to move the message reply and its message string (associated messages) into a quarantine folder of a draft folder of the mail client, and add a second alert message that states, for example, "The message in question has been moved to the Quarantine (or Drafts) folder for the user to further review."

In a fourth embodiment of the invention, the software embodying the fourth embodiment of the invention running on a recipient's mail client may verify that the Reply-To email header "Friendly Name" on an email transmitted to the target recipient is actually in the recipient's contact list.

Figure 9:
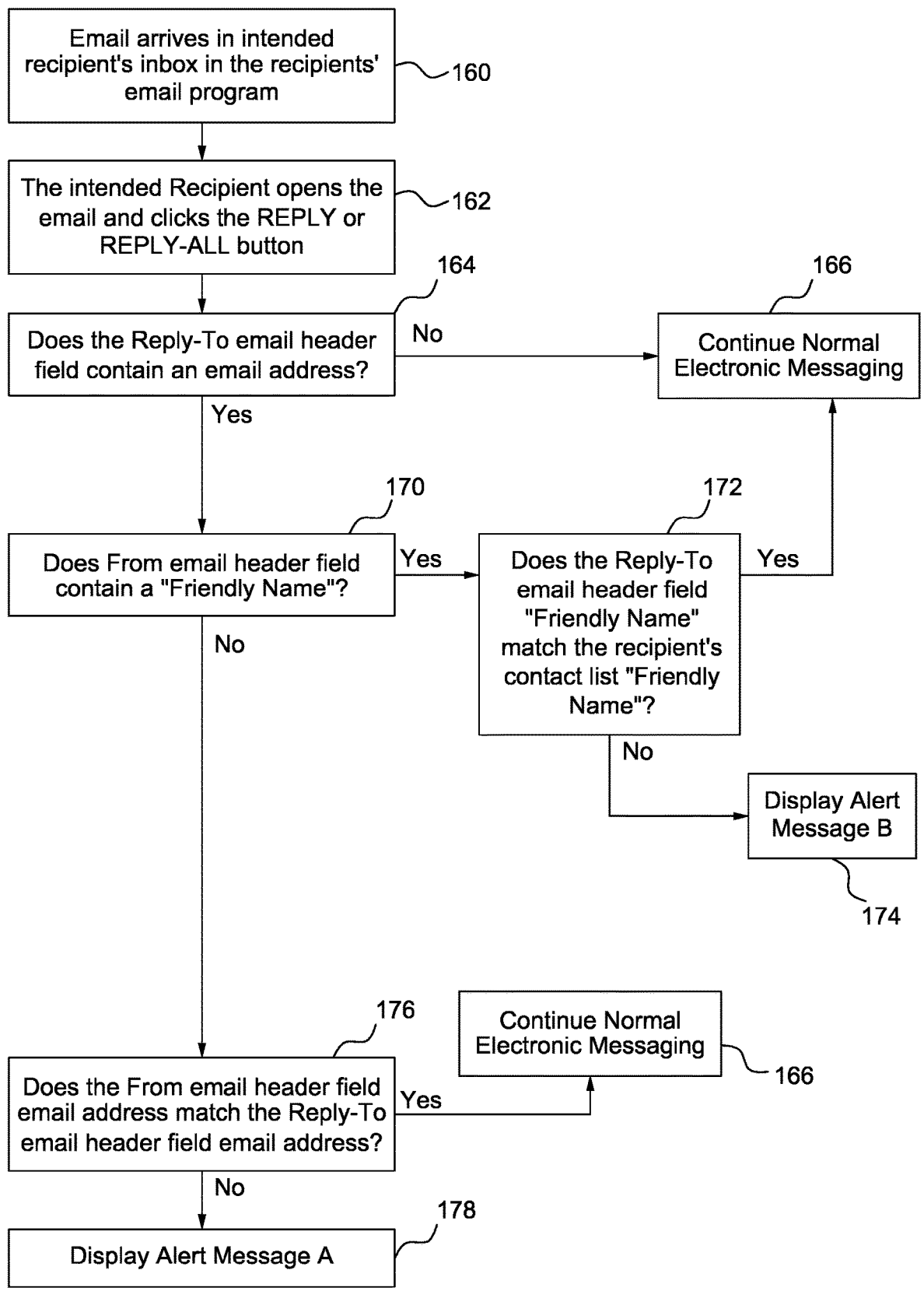
FIG. 9 is a flow diagram the processes carried out by a fourth embodiment of the invention.

FIG. 9 is a flow chart illustrating an the various methods, processes, and logic carried out by the fourth embodiment of the invention. As stated previously, these methods, processes, and logic are embodiment in software and hardware that runs on a recipient's email client.

In the fourth embodiment, the fraudulent email arrives in the target recipient's email inbox of the recipient's email client in box 160. If the target recipient opens the email and then clicks on the Reply or Reply-All buttons of the email client in box 162, the command to compose a reply message is intercepted by the programming commands of the first embodiment of the invention, and they analyzed to determine if the Reply-To email header field of the message contains an email address in box 164. If the Reply-To email header field does not contain an email address, the programming commands of the fourth embodiment of the invention terminate and the email client displays a typical reply email message format to the recipient, and then continues with normal electronic messaging in box 166.

If the Reply-To email header field does contain an email address in box 164, then in box 170, the email headers are further analyzed to determine if the email address contained in the From email header field contains a "Friendly Name". If the From email address in the From email header field is a "Friendly Name". If the From email header field contains a "Friendly Name" in box 170, the processes determines whether the Reply-To email header field "Friendly Name" is contained in an entry in the recipient's contact list in box 172, If the contents of the Reply-To email header field is contained in the recipient's contact list, then the process terminates and the reply email format is displayed to the recipient and normal electronic message processing continues in box 166. If the contents of the Reply-To email header is not contained in the recipient's contact list, Alert Message B is displayed to the recipient in box 174.

If the From email header field does not contain a "Friendly Name" as determined in box 170, the process then determines if the email address contained in the From email header field matches the email address contained in the Reply-To email header field in box 176. If the email addresses of the From field and the Reply-To fields match, then the process terminates and continues normal electronic messaging in box 166. If they do not match, alert message A is displayed to the recipient in box 178.

In all of the embodiments of the invention described above, the programming commands embodying the various embodiments of the invention may start at different points in the process of managing the email at the recipient; for example, the process may start when the email arrives at the recipient email server, email account, inbox, reply before the message displays, reply after the message displays, reply-send, reply-outbox or elsewhere.

In a further embodiment, the programming commands embodying the various embodiments of the invention noted above may operate when an email first enters the intended recipient's email inbox, when they first open the email in their inbox, when they click reply or reply-all, when they click forward as noted above, at time intervals, or as the user clicks the send button after composing a reply message.

In a further embodiment, the programming commands embodying the various embodiments of the invention noted above may run on a server that is on the inbound message path to the intended recipient, or on the outbound message path after the intended recipient has replied and before the message reaches the Internet mail transport agent for Internet processing. In these emblements, there may be a process for an administrator, or recipient to review messages that triggered an Alert message.

In a further embodiment, there may be a variety of caution and warning messages provided by the programming commands embodying the various embodiments of the invention, or other functions that occur instead of displaying caution or warning messages, such as, for example, deleting the message, quarantining the message, moving the message to a special folder, or displaying an alert or warning or another indication in the message visible to the intended recipient. The ability to continue sending when an Alert message appears could be blocked or frozen pending an action by the recipient.

In further embodiments, when the programming commands embodying the various embodiments of the invention may trigger the caution or warning message, a message could be transmitted to the "From" Email Header "Email Address" that indicates that the individual associated with the "From" Email Header "Email Address" may be part of an Internet Imposter Scheme and should contact their IT Administrator with regards to the Message. Additionally, the message in question could be attached to this message in a message file format for further investigation.

It is contemplated that various modifications may be made to the rules and scenarios described above, including, for example, using In-Reply-To and other more obscure address and header fields to affect the processes described, and the invention should limited therefore.

The first and second embodiments of the invention described above, for example, can be written using programming commands installed into common email client user interfaces such as Microsoft Outlook, Microsoft Outlook Online, Google Gmail, among others.

For example, in the case of installing the invention into Google Gmail, the programming commands may be written using the Google Chrome Browser framework for Chrome Browser Extensions. These Extensions allow one to add the programming commands embodying the various embodiments of the invention to Chrome without diving deeply into native code using familiar web development methods of: HTML, CSS, and JavaScript. Using this method, upon the end user selecting a User Interface (UI) element of the web based Google Gmail program viewed using a Chrome Browser, the UI element will call a browser action, which triggers the running of the programming commands embodying the various embodiments of the invention. For example, opening an email in the Google Gmail program Inbox viewed using a Chrome Browser and clicking the REPLY button in the UI, can trigger the programming commands embodying the various embodiments of the invention for examining the described message headers, matching the described header elements, and depending on the result triggering the described follow-on action. Programming in this example would be done as a Chrome Browser Extension and installed by end users for example, by Google itself, or by a third party, as a zipped bundle of files—HTML, CSS, JavaScript, images, and other elements needed that add the described functionality to the Google Chrome browser. In this instance, the Extension are essentially web pages, and they can use all the APIs that the browser provides to web pages, from XMLHttpRequest to JSON to HTML5. The Extension can interact with web pages or servers using content scripts or cross-origin XMLHttpRequests.

In the case of installing the various embodiments of the invention into Microsoft Outlook, one example would be to write the programming commands noted in the described embodiments, using the Dot-Net framework to create a Microsoft Outlook COM-Add-in or a Microsoft Office Add-in using the Microsoft JavaScript API for Office that enables one to create web applications that interact with the object models in Office host applications. The various embodiments of the invention run as an application that references the office.js library, which is a script loader. The office.js library loads the object models that are applicable to the Office application that is running the add-in. One can use these JavaScript object models and Com-Add-In APIs, depending on Microsoft Versions. Alternatively, the Microsoft.Office.WebExtension namespace (which by default is referenced using the alias Office in code) contains objects that can be used to write the invention scripts that interact with the UI element that triggers the running of the invention commands. For example, opening an email in the Microsoft Outlook email client program Inbox and clicking the REPLY button in the UI, can trigger various embodiments of the invention to examine the described message headers, match the described header elements, and depending on the result, trigger the described follow-on action. The Microsoft Add-In that contains the various embodiments of the invention commands may be installed by end users for example, by Microsoft itself, or by a third party.

The third embodiment of the invention, for example, can be written using programming commands installed into common Mail Transport Agent software that is installed on a mail server, email security appliance or email security gateway that is configured to receive inbound email traffic. These programming commands, depending on the version software of Mail Transport Agent and the operating system of the servers, could be written using a variety of programming tools and programming languages, or frameworks such as Microsoft's Dot-Net framework. The scrips embodying the various embodiments of the invention can be written as software commands that operate on messages that are inside a process of the Mail Transport Agent, mail server, email security appliance or email security gateway, such that the commands are operating as part of a process within these email management functions.

Figure 10:
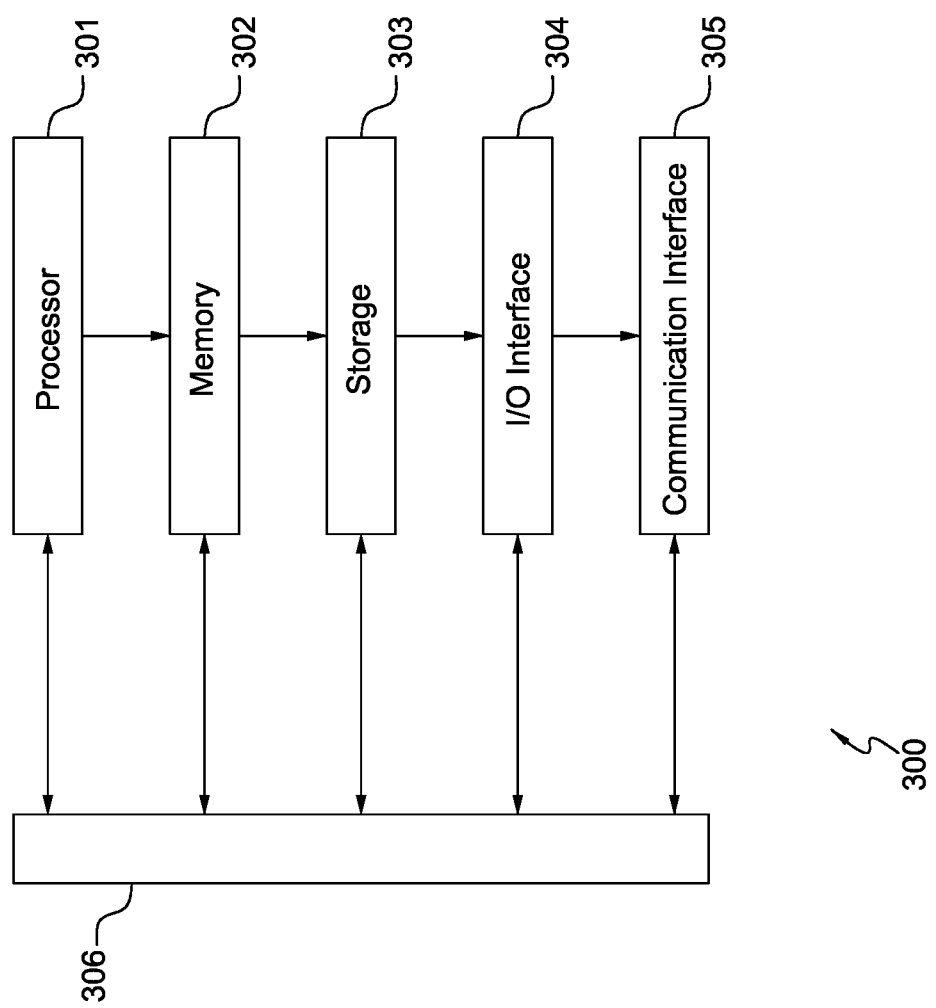
FIG. 10 is graphical representation of representative components and processes of a server system used to carry out various embodiments of the present invention.

FIG. 10 is graphic representation of an exemplary computer system 300 which may be used with the various embodiments of the present invention, which may be, for example, a server or a client computer system. Computer system 300 may take any suitable form, including but not limited to, an embedded computer system, a system-on-chip (SOC), a single-board computer system (SBC) (such as, for example, a computer-on-module (COM) or system-on-module (SOM)), a laptop or notebook computer system, a smart phone, a personal digital assistant (PDA), a server, a tablet computer system, a kiosk, a terminal, a mainframe, a mesh of computer systems, etc. Computer system 300 may be a combination of multiple forms. Computer system 300 may include one or more computer systems 300, be unitary or distributed, span multiple locations, span multiple systems, or reside in a cloud (which may include one or more cloud components in one or more networks).

In one embodiment, computer system 300 may include one or more processors 301, memory 302, storage 303, an input/output (I/O) interface 304, a communication interface 305, and a bus 306. Although this disclosure describes and illustrates a particular computer system having a particular number of particular components in a particular arrangement, this disclosure contemplates other forms of computer systems having any suitable number of components in any suitable arrangement.

In one embodiment, processor 301 includes hardware for executing instructions, such as those making up software. Herein, reference to software may encompass one or more applications, byte code, one or more computer programs, one or more executable module or API, one or more instructions, logic, machine code, one or more scripts, or source code, and or the like, where appropriate. As an example and not by way of limitation, to execute instructions, processor 301 may retrieve the instructions from an internal register, an internal cache, memory 302 or storage 303; decode and execute them; and then write one or more results to an internal register, an internal cache, memory 302, or storage 303. In one embodiment, processor 301 may include one or more internal caches for data, instructions, or addresses. Memory 303 may be random access memory (RAM), static RAM, dynamic RAM or any other suitable memory. Storage 305 may be a hard drive, a floppy disk drive, flash memory, an optical disk, magnetic tape, or any other form of storage device that can store data (including instructions for execution by a processor).

In one embodiment, storage 303 may be mass storage for data or instructions which may include, but not limited to, a HDD, solid state drive, disk drive, flash memory, optical disc (such as a DVD, CD, Blu-ray, and the like), magneto optical disc, magnetic tape, or any other hardware device which stores computer readable media, data and/or combinations thereof. Storage 303 maybe be internal or external to computer system 300.

In one embodiment, input/output (I/O) interface 304 includes hardware, software, or both for providing one or more interfaces for communication between computer system 300 and one or more I/O devices. Computer system 300 may have one or more of these I/O devices, where appropriate. As an example but not by way of limitation, an I/O device may include one or more mouses, keyboards, keypads, cameras, microphones, monitors, displays, printers, scanners, speakers, cameras, touch screens, trackball, trackpad, biometric input device or sensor, or the like.

In still another embodiment, a communication interface 305 includes hardware, software, or both providing one or more interfaces for communication between one or more computer systems or one or more networks. Communication interface 305 may include a network interface controller (NIC) or a network adapter for communicating with an Ethernet or other wired-based network or a wireless NIC or wireless adapter for communications with a wireless network, such as a Wi-Fi network. In one embodiment, bus 306 includes any hardware, software, or both, coupling components of a computer system 300 to each other.

Figure 11:
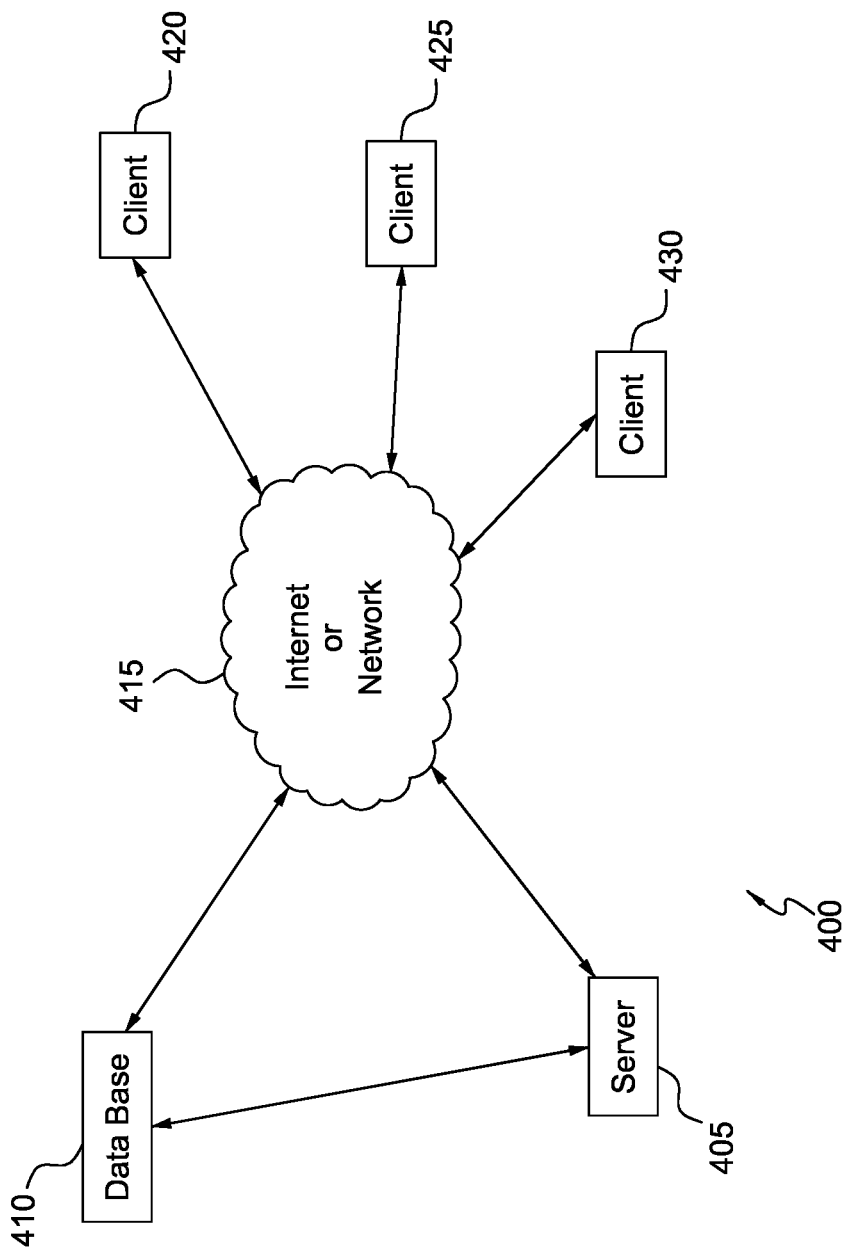
FIG. 11 is a graphical representation of a system incorporating various embodiments of the present invention and depicts various computers, terminals, servers and networks on which the various embodiments of the present invention are carried out.

FIG. 11 is a graphical representation of an exemplary network 400 that may be used to facilitate the various embodiments of the present invention. Server 405 is operated by a structured settlement services organization, and typically includes at least one processor, input and output equipment or devices, memory, storage, and a communication interface as discussed above with regards to FIG. 10. The server also operates under the control of specialized software programming commands that are designed to carry out the various processes described above.

A data storage device 410, which may be separate from the server, but not necessarily, may be accessible to the server 405, and may be used for storing date related to information and any other data related to operation of the various embodiments of the system and method described above. The data storage device 410 may directly connected to the server, or it may be accessible to the server through a network or the Internet, The data storage device may also be a virtual storage device or memory located in the Cloud. Application to be executed on the client devices, or at the server level, may also be stored in, and accessed from, the Cloud.

Server 405 may communicate with a network 415, which may be, for example, a local area network (LAN) or a wide area network (WAN) or the Internet and the World Wide Web. The server may communicate through the network 415 with clients 420, 425, and 630. Client device(s) will include processors and other ancillary equipment as described above.

Those skilled in the art will understand that the connections between server 405, data storage 410, network 415, client devices 420, 425, and 430 may be hard wired, or they may be wireless. As stated above, client device may be any device capable of operably connecting the network and accessing a web page or account hosted by server 405.

Figure 12:
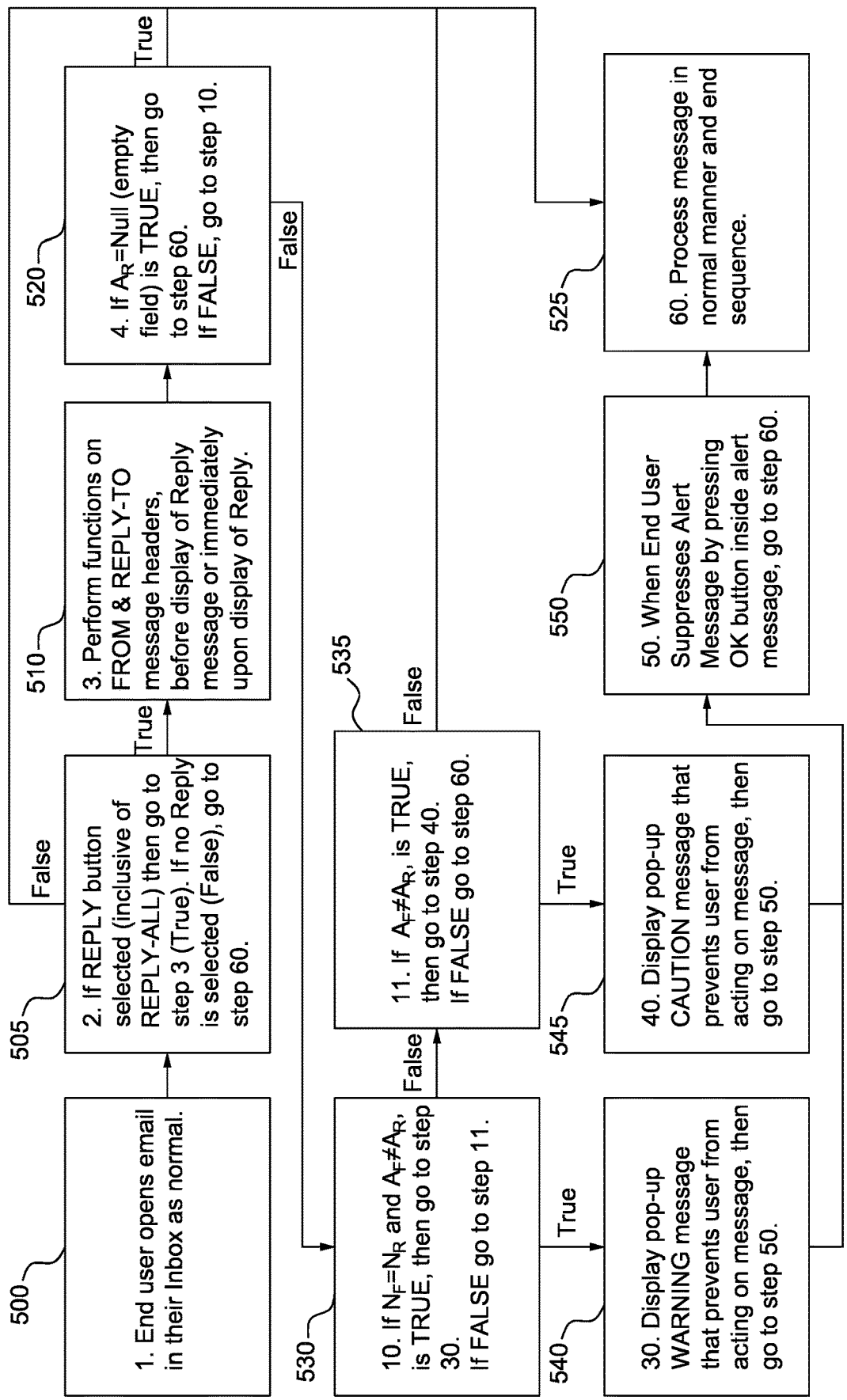
FIG. 12 is a flow diagram of an embodiment of the invention having a trigger being selecting a REPLY or REPLY-ALL buttons in an email user interface and having two levels of actions.

FIG. 12 is a flow chart illustrating an alternative to the second embodiment of the invention described above that are directed to when a recipient activates the "Reply" or "Reply All" function of his or her email client upon opening a received email.

In box 500, the End user opens an email in their Inbox as normal. If the Reply button or Reply-All button is selected by the recipient in box 505, then the software commands embodying the second embodiment of invention are applied in box 510 to the FROM and REPLY-TO message headers, before display of a Reply message or immediately upon display of Reply message. If the recipient does not desire to send a reply, then the email is processed in the normal manner sequence in box 525.

If the Reply or Reply-All buttons are activated, the process determines if the Reply-To email header "Email Address" is empty in box 520. If the result of the logic is true, the process terminates and the message is processed in the normal manner and sequence. If the result of the logic is false, the process compares, in box 530, to determine if the contents of the From email header "Friend Name" is equal to the contents of the Reply-To email header "Friendly Name" and if the contents of the From email header "Email Address" is not equal to the contents of the Reply-To email header "email Address", and if the logic is false, then the process determines whether the contents of the From email header "Email Address" is not equal to the contents of the Reply-To email header "Email Address" in box 535; and if that logic is false, the process terminates and the message is process in a normal manner and sequence in box 525. If the logic in box 535 is true, the process displays a Caution message that prevents the recipient from acting on the message in box 545. The Caution message may include an "OK" button, which, when activated by the recipient, causes the process to branch to box 550 where the Caution message is suppressed, terminates the process, and then processes the message in a normal manner and sequence in box 525.

Returning now to box 530, if the logic of the comparison in box 530 is true, that is, that the contents of the From email header "Friend Name" is equal to the contents of the Reply-To email header "Friendly Name" and if the contents of the From email header "Email Address" is not equal to the contents of the Reply-To email header "email Address", the process branches to box 540. In box 540, the process displays a Warning message that prevents the recipient from acting on the message. As above, the Warning message may include an "OK" button, which, when activated by the recipient, causes the process to branch to box 550 where the Warning message is suppressed, terminates the process, and then processes the message in a normal manner and sequence in box 525.

The text of the Whaling Alert messages discussed above can be configured in a configuration file associated with the programming commands of the various embodiments of the invention, thus allowing the alert messages to be adapted to a particular use or client requirement. For example, the text of Warning Alert Message for Whaling Alert Replies as described in box 540 may be: "Warning: Your reply email will be routed to someone other than the displayed email sender. This will very likely cause your message to be routed to an unknown third party that may have malicious intent. We strongly recommend that you investigate further before replying, call the person in the "from" address field to verify if they sent the original message, and notify your IT administrator that you may be the victim of a "Whaling" class of Phishing attack. Click OK to continue."

Similarly, the text of the Caution Alert described in box 545 may be: "Caution: Your reply email will be routed to someone other than the displayed original email sender. This could cause your message to be routed to an unknown third party. You should verify if the person in the "from" address in fact sent you the original message. If you proceed with your reply, do so with caution. Click OK to continue."

In an embodiment of the invention, the text of the messages may be established through a user interface such as, for example, providing a TAB on the user interface, which, when opened by a user, displays an option with a checkbox named, for example, "Anti-Whaling Phishing Alerts". The option may set ON by default, or it may add a further option for adding a customized alert message.

Figure 13:
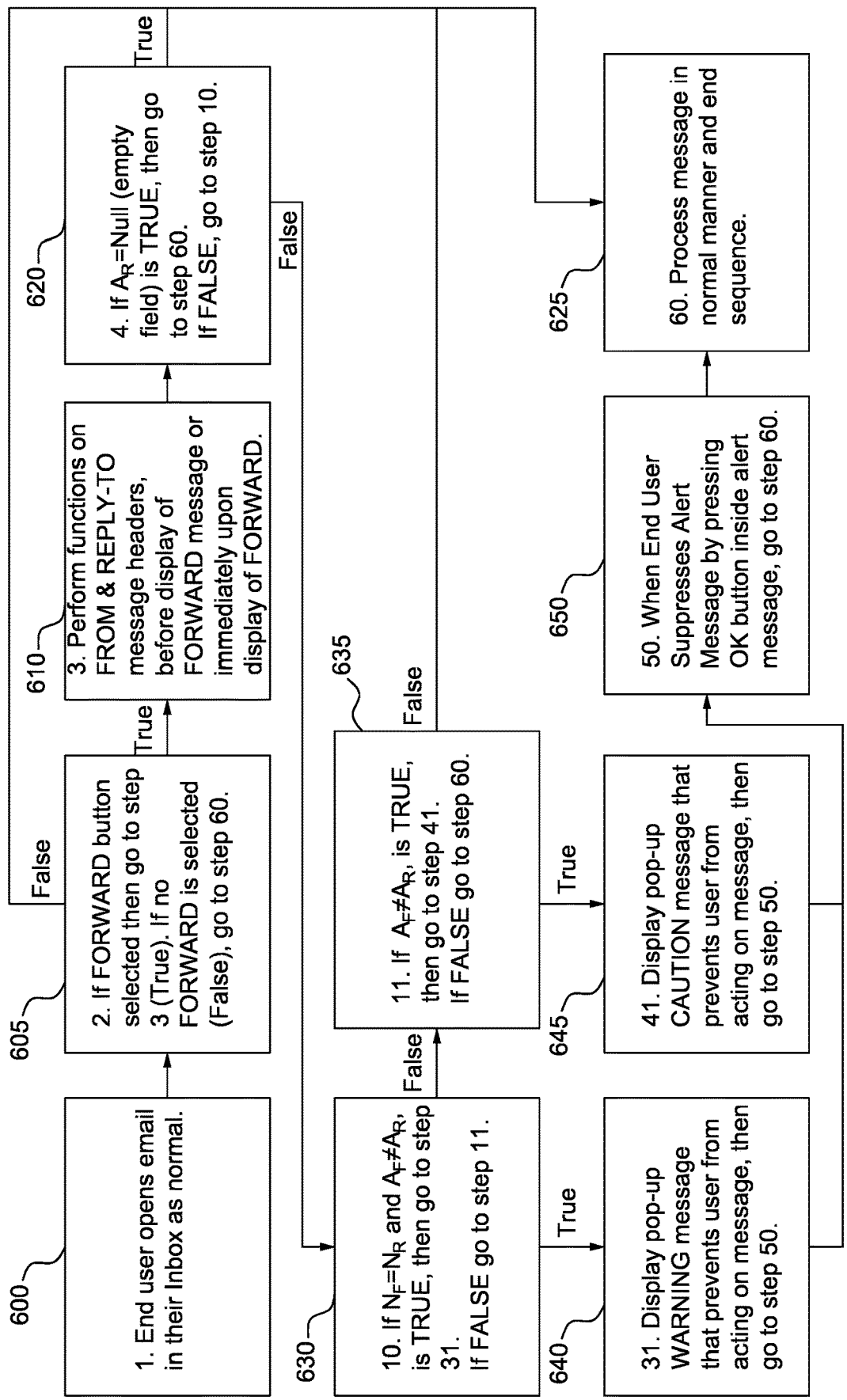
FIG. 13 is a flow diagram of an embodiment of the invention having a trigger being selecting the FORWARD button in the email user interface and having two levels of actions.

FIG. 13 is a flow chart illustrating an alternative to the second embodiment of the invention described above that are directed to when a recipient activates the "Forward" function of his or her email client upon opening a received email.

In box 600, the End user opens an email in their Inbox as normal. If the Forward button is selected by the recipient in box 605, then the software commands embodying the second embodiment of invention are applied in box 610 to the FROM and REPLY-TO message headers, before display of a Forward message or immediately upon display of a Forward message. If the recipient does not desire to forward the message in box 605, then the email is processed in the normal manner sequence in box 625.

If the Forward button is activated, the process determines if the Reply-To email header "Email Address" is empty in box 620. If the result of the logic is true, the process terminates and the message is processed in the normal manner and sequence in box 625. If the result of the logic is false, the process tests, in box 630, to determine if the contents of the From email header "Friend Name" is equal to the contents of the Reply-To email header "Friendly Name" and if the contents of the From email header "Email Address" is not equal to the contents of the Reply-To email header "email Address", and if the logic is false, then the process determines whether the contents of the From email header "Email Address" is not equal to the contents of the Reply-To email header "Email Address" in box 635; and if that logic is false, the process terminates and the message is process in a normal manner and sequence in box 625. If the logic in box 635 is true, the process displays a Caution message that prevents the recipient from acting on the message in box 645. The Caution message may include an "OK" button, which, when activated by the recipient, causes the process to branch to box 650 where the Caution message is suppressed, terminates the process, and then processes the message in a normal manner and sequence in box 625.

Returning now to box 630, if the logic of the comparison in box 630 is true, that is, that the contents of the From email header "Friend Name" is equal to the contents of the Reply-To email header "Friendly Name" and if the contents of the From email header "Email Address" is not equal to the contents of the Reply-To email header "email Address", the process branches to box 640. In box 640, the process displays a Warning message that prevents the recipient from acting on the message. As above, the Warning message may include an "OK" button, which, when activated by the recipient, causes the process to branch to box 650 where the Warning message is suppressed, terminates the process, and then processes the message in a normal manner and sequence in box 625.

Similar to the Reply case discussed above, the text of the Whaling Alert messages used in the Forward case can be configured in a configuration file associated with the programming commands of the various embodiments of the invention, thus allowing the alert messages to be adapted to a particular use or client requirement. For example, the text of the Warning Alert Message for Whaling Alert Forwards may be: "Warning: You are forwarding an email that was likely not sent from the sender whose name appears in the "from" field. This will very likely cause the recipient of your forwarded message to erroneously think that the message you are forwarding is authentic and from the named sender, when in fact it is likely not an authentic email. We strongly recommend that you investigate further before forwarding this message, call the person in the "from" address field to verify if they sent the original message, and notify your IT administrator that you may be the victim of a "Whaling" class of Phishing attack. Click OK to continue."

Similarly, the text of the Caution Alert Message for Whaling Alert Forwards may be: "Caution: You are forwarding an email that may not have been sent from the sender whose name appears in the "from" field. This may cause the recipient of your forwarded message to erroneously think that the message you are forwarding is authentic and from the named sender, when in fact it may not be an authentic email. You should verify if the person in the "from" address in fact sent you the original message. If you proceed with your reply, do so with caution. Click OK to continue."

Figure 14:
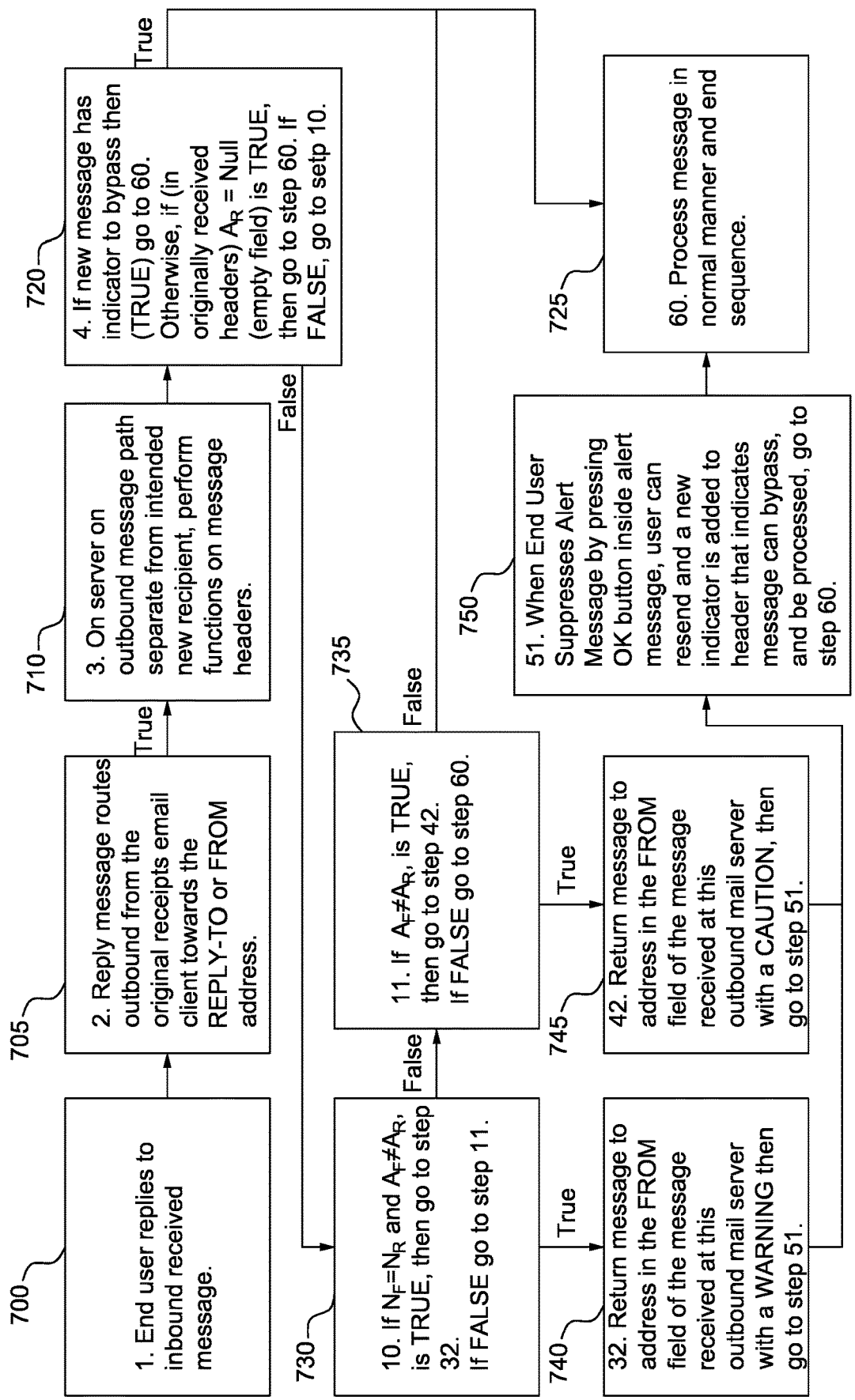
FIG. 14: is a flow diagram of an embodiment of the invention having a trigger being a review and parsing of headers of originally received inbound messages on an outbound message path toward the originally received reply-to message header address, on a server separate from the reply-to recipient.

FIG. 14 is a flow chart illustrating an embodiment of the invention having a trigger being a review and parsing of headers of originally received inbound messages on an outbound message path toward the originally received Reply-To message header address, on a server separate from the reply-to recipient.

In box 700, the End user replies to an inbound email received in their Inbox. The reply message routes outbound from the original recipient's email towards the Reply-To or From address in box 705. When the reply message is received by a server that is remote from the recipient of the reply message, the server, utilizing programming commands embodying various embodiments of the invention, analyzes the message headers in box 710. If the reply message possess a unique BYPASS indicator known to have been applied by an authorized outbound processing server, the receiving server understands that the BYPASS indicator was applied by the recipient to instruct the receiving server to bypass further review of the message due to the target recipient (who sent the reply) overriding a previously issued alert associated with the message in box 720, and the process then branches to box 725, where the message is processed in a normal manner and sequence and transmitted on to the intended recipient of the reply. Alternately if the If the Reply-To email header "Email Address" is empty in box 720, the process then branches to box 725, where the message is processed in a normal manner and sequence and transmitted on to the intended recipient of the reply.

If the result of the logic in box 720 is false, the process determines, in box 730, if the contents of the From email header "Friend Name" is equal to the contents of the Reply-To email header "Friendly Name" and if the contents of the From email header "Email Address" is not equal to the contents of the Reply-To email header "email Address", then the process determines whether the contents of the From email header "Email Address" is not equal to the contents of the Reply-To email header "Email Address" in box 735; and if that logic is false, the process terminates and the message is process in a normal manner and sequence in box 725.

If the logic in box 735 is true, the process returns the message to the address in the From field of the message received at the server, with a Caution message in box 745. The Caution message may include an "OK" button, which, when activated by the recipient, causes the process to branch to box 750 where the Caution message is suppressed, the user may resend the message and a new indicator is added to the header of the outgoing message indicating that message can bypass further review, and then processes the message in a normal manner and sequence in box 725.

Returning now to box 730, if the logic of the comparison in box 730 is true, that is, that the contents of the From email header "Friend Name" is equal to the contents of the Reply-To email header "Friendly Name" and if the contents of the From email header "Email Address" is not equal to the contents of the Reply-To email header "email Address", the process branches to box 740. In box 740, the process returns the message to the address in the From field of the message received at the server, and may include a Warning alert message with the returned message. When the returned message is displayed to the sender of the Reply message, the Warning message may also include an "OK" button, which, when activated by the recipient in box 750, suppressing the message. The user may then resend the message and a new indicator is added to the header of the outgoing message indicating that message can bypass further review, and then processes the message in a normal manner and sequence in box 725.

Figure 15:
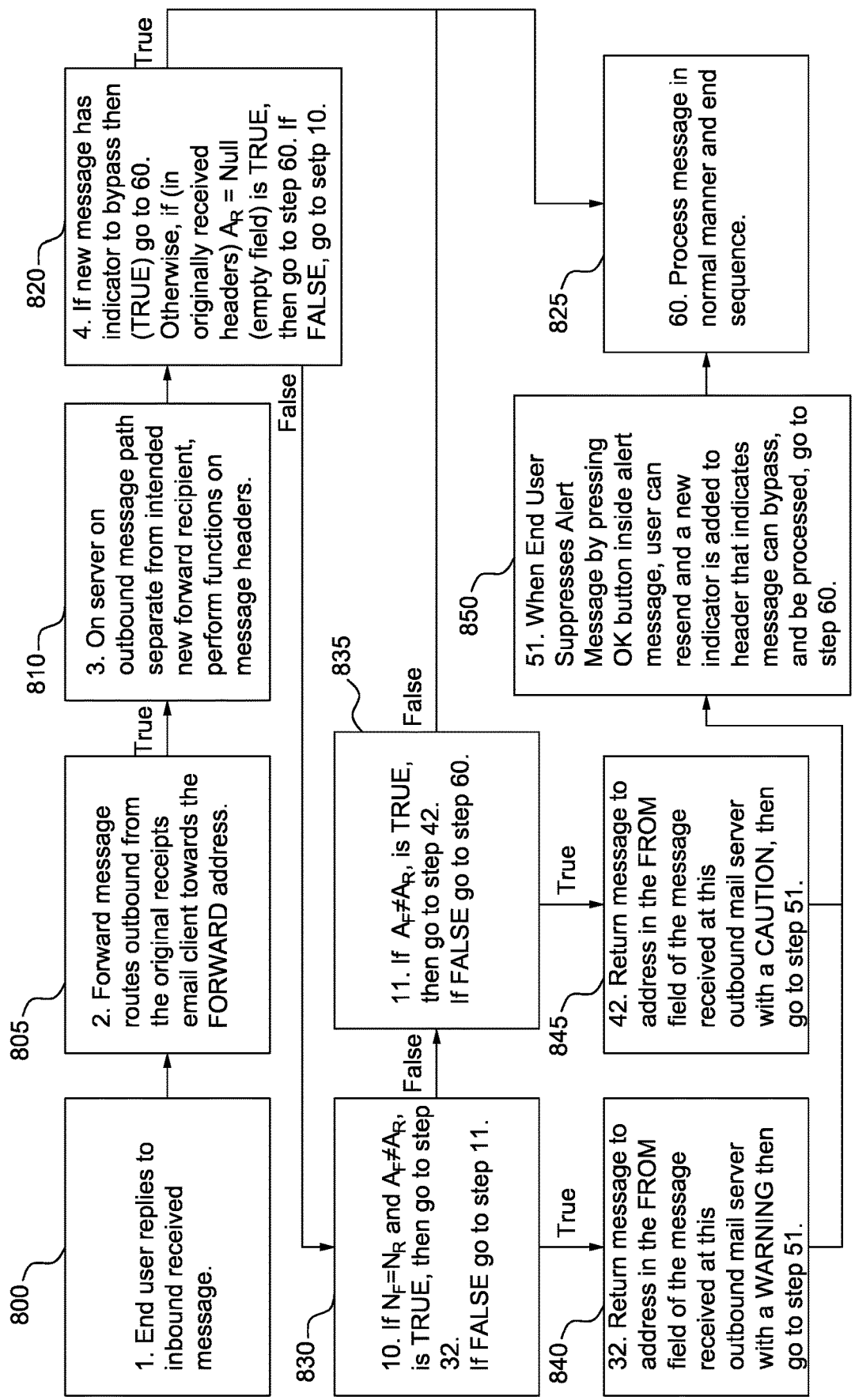
FIG. 15 is a flow diagram of an embodiment of the invention having a trigger being a review and parsing of headers of originally received inbound messages after forward on the outbound message path toward the forward recipient on a server separate from the forward recipient.

FIG. 15 is a flow chart illustrating an embodiment of the invention having a trigger being a review and parsing of headers of originally received inbound messages after forwarding the message on an outbound message path toward a forward recipient, on a server separate from the forward recipient.

In box 800, the End user replies to an inbound email received in their Inbox. The end user then forwards the message on routes outbound from the original recipient's email towards the Forward address in box 805. When the reply message is received by a server that is remote from the recipient of the forward message, the server, utilizing programming commands embodying various embodiments of the invention, analyzes the message headers in box 810. If the forward message possess a unique BYPASS indicator known to have been applied by an authorized outbound processing server, the receiving server understands that the BYPASS indicator was applied by the recipient to instruct the receiving server to bypass further review of the message due to the target recipient (who sent the reply) overriding a previously issued alert associated with the message in box 820, and the process then branches to box 825, where the message is processed in a normal manner and sequence and forwarded on to the intended recipient of the forwarded message. Alternately if the If the Reply-To email header "Email Address" is empty in box 820, the process then branches to box 825, where the message is processed in a normal manner and sequence and transmitted on to the intended recipient of the forwarded message.

If the result of the logic in box 820 is false, the process determines, in box 830, if the contents of the From email header "Friend Name" is equal to the contents of the Reply-To email header "Friendly Name" and if the contents of the From email header "Email Address" is not equal to the contents of the Reply-To email header "email Address", then the process determines whether the contents of the From email header "Email Address" is not equal to the contents of the Reply-To email header "Email Address" in box 835; and if that logic is false, the process terminates and the message is process in a normal manner and sequence in box 825.

If the logic in box 835 is true, the process returns the message to the address in the From field of the message received at the server, with a Caution message in box 845. The Caution message may include an "OK" button, which, when activated by the recipient, causes the process to branch to box 850 where the Caution message is suppressed, the user may resend the message and a new indicator is added to the header of the outgoing message indicating that message can bypass further review, and then processes the message in a normal manner and sequence in box 825.

Returning now to box 830, if the logic of the comparison in box 830 is true, that is, that the contents of the From email header "Friend Name" is equal to the contents of the Reply-To email header "Friendly Name" and if the contents of the From email header "Email Address" is not equal to the contents of the Reply-To email header "email Address", the process branches to box 840. In box 840, the process returns the message to the address in the From field of the message received at the server, and may include a Warning alert message with the returned message. When the returned message is displayed to the sender of the forwarded message, the Warning message may also include an "OK" button, which, when activated by the recipient in box 850, suppressing the message. The user may then resend the message and a new indicator is added to the header of the outgoing message indicating that message can bypass further review, and then processes the message in a normal manner and sequence in box 825.

In an embodiment of the present invention, a recipient maintain an exception list of From email addresses or Sender email addresses that, when detected by the analysis function of the various embodiments, would cause the programming commands of the embodiment to, depending on how the embodiment is configured, bypass the process or, alternatively, invoke the process yet cause the alert (whether Caution or Warning) to be overridden. In such a case, the alert or full processing would only occur on select inbound messages such as when the From or Sender email address was in the exception list. Conversely, the process may be configured to only process messages where the From or Sender email address was not contained in the exception list.

While these descriptions refer to email protocols and email message headers, the various embodiments of the invention may be implemented in any other electronic messaging protocols that have a reply function including, but not limited to, protocols for Short Message Service (SMS), Multimedia Messaging Service (MMS), Instant Messaging (IM), Extensible Messaging and Presence Protocol (XMPP), Real Time Messaging Protocol (RTMP), EDI Messaging Protocols (AS2, FTP, OFTP, HTTP/HTTPS, TLS, AMQP, MQTT, STOMP), and more.

While these descriptions of the various embodiments of the invention contemplate a number of iterations of when or on what server or email client performs the review, testing, parsing, or comparison of email message headers occurs, or in what order of operation, the various embodiments of the invention may include any number of iterations and combinations. The order and action is not important to the scope of the invention. A person skilled in the art would immediately understand that what is important is detecting in the email message to determine if at least in the originally received or inbound email headers $A_F \neq A_R$, and if True, performing some action associated with the message. Alternatively, detecting a more serious situation, whereby detecting in at least in the originally received or inbound email headers if $N_F = N_R$ and $A_F \neq A_R$, and if True, performing some action associated with the message.

The detection may occur on a server separate from the sender on the inbound message path towards the target recipient, at the target recipient's email client on their computer or device, or after reply on the outbound message path toward the originally received reply-to message header address, on a server separate from the reply-to recipient; or after forward on the outbound message path toward the forward recipient on a server separate from the forward recipient.

An advantage of the various embodiments of the invention is to mitigate risk of recipients falling prey to what we call herein as the "Reply-To Whaling" scheme. Thus, the various embodiments of the invention are designed to identify, alert, or otherwise cause action to block activity, or inform authentic senders of email of the fact that their identity is being used in an Internet criminal scheme to trick a recipient into taking some action, typically that action being to transfer money.

A further advantage of the various embodiments of the invention is to identify, alert, or otherwise cause action to block activity or inform authentic recipients of email that the email that they are replying to may not be transmitted to their intended recipient, but instead may be re-directed using standard Internet messaging protocols to an imposter who may continue to purport to be the authentic sender, through back-and-forth email and to prevent an Internet criminal from using message content and/or context to convince an authentic recipient to transfer money.

Still another advantage of the various embodiments of the invention is to identify, alert, or otherwise cause action to block activity or inform authentic recipients of email that the email that they are preparing to forward may not be from the authentic sender sending identified in the From address of the message that they are preparing to forward; and may be from an imposter.

While considerable emphasis has been placed herein on the particular features of the various embodiments and the improvisation with regards to it, it will be appreciated that various modifications can be made in the embodiments without departing from the principles of the invention. These and other modifications in the nature of the invention will be apparent to those skilled in the art from the disclosure herein, whereby it is to be distinctly understood that the foregoing descriptive matter is to be interpreted merely as illustrative of the invention and not as a limitation. It is understood that various different modifications within the scope and spirit of the invention are possible. The invention is limited only by the scope of the appended claims.

I claim:

1. A system including an email client comprising:
   a memory disposed in an email client,
   a processor disposed in the email client and in communication with the memory, the processor programmed using programming commands stored in the memory to analyze content, including elements of message headers of a received inbound message after an end user of the email client initiates an action to the received inbound message, and to initiate a second action as a result of the review if a comparison of the a value of a "From" Friendly Name email header field (NF) to a value of a "Reply to" Friendly Name email header field (NR) of an inbound message is true and a comparison of a value of a "From" email address email header field (AF) to a value of a "Reply to" email address header field (AR) of the inbound message is false.

2. A system as described in claim 1, wherein the end user's initiated action is one or more actions selected from the group of actions consisting of opening the message, replying to the message, replying-all to the message, forwarding the message, and viewing the message.

3. The system as described in claim 1, wherein the end user initiated action is clicking a REPLY button, a REPLY-ALL button, or a FORWARD button in a user interface of the email client.

4. The system as described in claim 1, wherein the second action is displaying an alert message.

5. The system as described in claim 1, wherein the second action is moving the message to a different folder stored in the memory associated with the processor or a different memory.

6. The system as described in claim 1, wherein the second action is sending an alert to both the email addresses in a TO and the FROM email header fields of the inbound message.

7. A system having an email client, comprising
   a memory disposed in an email client;

a processor disposed in the email client and in communication with the memory, the processor programmed using programming commands stored in the memory:

to review content of an inbound message after the user of the email client initiates an action to the inbound message, the programming commands of the processor configured:

to determine if a value of a "Reply to" email address header field (AR) is not null indicating an empty field and if a value of a "From" Friendly Name email header field (NF) is equal to a value of a "Reply to" Friendly Name email header field (NR) and if a value of a "From" email address header field (AF) is not equal to a value of a "Reply to" email address header field, to perform a special action on the message.

8. The system as described in claim 7, wherein the user initiated action is clicking a REPLY button in the email client user interface.

9. The system as described in claim 7, wherein the special action is displaying an alert message.

10. The system as described in claim 7, wherein the special action is moving the message to a different folder stored in the memory associated with the processor.

11. The system as described in claim 7, wherein the special action is sending an alert to both the email address in a TO and the FROM email header fields.

12. An emailing system having a server disposed on an outbound message path toward an email address contained in an originally received reply-to message header address, the server being separate from an email client system of a recipient having the reply-to email address, comprising:

a processor associated with the server and in communication with a memory associated with the server, the processor programmed using programming commands stored in the memory to review content of an inbound message received by the server, the processor programmed:

to determine if a value of a "Reply to" email address header field (AR) is not null indicating an empty field and if a value of a "From" Friendly Name email header field (NF) is equal to a value of a "Reply to" Friendly Name email header field (NR) and if a value of a "From" email address header field (AF) is not equal to a value of a "Reply to" email address header field, the processor of the server being further programmed using programming commands to perform a special action on the message, wherein the special action is one or more of actions selected from the group of actions consisting of marking the inbound message with an alert or other marking and then processing the inbound message by sending it to the recipient, quarantining the inbound message, putting the inbound message into a special folder, adding a header to the inbound message, deleting the inbound message, sending a separate message to the From message header email address and the To message header email address of the inbound message, or any other actions other than or in addition to normal message sending; and wherein the email client system includes:

a client memory, a client processor disposed in the email client system and in communication with the client memory, the client processor programmed using programming commands stored in the client memory:

to review content of a received inbound message after the email client recipient initiates an action to the received inbound message, the programming commands of the client processor configured:

to determine if a value of a "Reply to" email address header field (AR) is not null indicating an empty field and if a value of a "From" Friendly Name email header field (NF) is equal to a value of a "Reply to" Friendly Name email header field (NR) and if a value of a "From" email address header field (AF) is not equal to a value of a "Reply to" email address header field, to perform a special action on the message.

13. An emailing system with a server disposed on an outbound message path, the server separate from an email client system of a user who is the recipient of a message forwarded to the recipient by an original user, comprising:

a processor associated with the server and in communication with a memory, the processor programmed using programming commands stored in the memory to review content of a message received on the server from an original recipient of the message, the message having been forwarded by the original recipient to a forward recipient, the processor also being programmed to analyze message headers of the received message, and to determine if a value of a "Reply to" email address header field (AR) of the originally received message is not null indicating an empty field and if a value of a "From" Friendly Name email header field (NF) is equal to a value of a "Reply to" Friendly Name email header field (NR) of the originally received message and if a value of a "From" email address header field (AF) is not equal to a value of a "Reply to" email address header field of the originally received message, the processor of the server being further programmed using programming commands to perform a special action on the message if the result of the determination is true, and wherein the special action is one or more of actions selected from the group of actions consisting of marking the received message with an alert or other marking and then processing the received message by sending it to the forward recipient, quarantining the received message, putting the received message into a special folder of the memory, or a different meory, adding a header to the received message, deleting the received message, sending a separate message to the From message header email address and the To message header email address of the received message, or any other special action; and wherein the email client system includes:

a client memory, a client processor disposed in the email client system of the forward recipient and in communication with the client memory, the client processor programmed using programming commands stored in the client memory:

to review content of the forwarded originally received inbound message after the forward recipient initiates an action to the inbound forwarded message, the programming commands of the client processor configured:

to determine if a value of a "Reply to" email address header field (AR) is not null indicating an empty field and if a value of a "From" Friendly Name email header field (NF) is equal to a value of a "Reply to" Friendly Name email header field (NR) and if a value of a "From" email address header field (AF) is not equal to a value of a "Reply to" email address header field, to perform a special action on the inbound forwarded message.

\* \* \* \* \*